(12) United States Patent
Belt et al.

(10) Patent No.: US 11,231,549 B2
(45) Date of Patent: Jan. 25, 2022

(54) INTEGRATED ACTIVE/PASSIVE VISIBLE/UV MODULATOR

(71) Applicant: Honeywell International Inc., Morris Plains, NJ (US)

(72) Inventors: Michael Belt, Broomfield, CO (US); Molly Krogstad, Westminster, CO (US); Mary Rowe, Boulder, CO (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/683,335

(22) Filed: Nov. 14, 2019

(65) Prior Publication Data
US 2021/0149112 A1    May 20, 2021

(51) Int. Cl.
| | |
|---|---|
| *G02B 6/12* | (2006.01) |
| *G02B 6/138* | (2006.01) |
| *G02B 6/122* | (2006.01) |
| *G02B 6/136* | (2006.01) |
| *G02F 1/035* | (2006.01) |

(52) U.S. Cl.
CPC ........... *G02B 6/1228* (2013.01); *G02B 6/136* (2013.01); *G02B 2006/12142* (2013.01); *G02F 1/035* (2013.01)

(58) Field of Classification Search
CPC ......... G02B 6/1228; G02B 6/12; G02B 6/138
USPC .......................................................... 385/43
See application file for complete search history.

(56) References Cited

U.S. PATENT DOCUMENTS

| | | | | |
|---|---|---|---|---|
| 5,911,018 | A | * | 6/1999 | Bischel ................... G02F 1/011 385/11 |
| 6,545,791 | B1 | * | 4/2003 | McCaughan ............. G02F 1/03 359/237 |
| 2002/0122615 | A1 | * | 9/2002 | Painter ..................... G02B 6/10 385/15 |

(Continued)

OTHER PUBLICATIONS

Rao et al., Second-Harmonic Generation in Periodically-Poled Thin Film Lithium Niobate Wafer-Bonded on Silicon, [article, online], 2016, [retrieved Feb. 24, 2020] URL: https://www.osapublishing.org/oe/abstract.cfm?uri=oe-24-26-29941, 7 pages.

(Continued)

*Primary Examiner* — Kaveh C Kianni
(74) *Attorney, Agent, or Firm* — Alston & Bird LLP

(57) ABSTRACT

Integrated passive/active modulator units, integrated passive/active modulators comprising one or more units, and corresponding methods of fabrication and use are provided. In an example embodiment, a unit comprises an upstream passive portion comprising a passive waveguide; a downstream passive portion comprising a continuation of the passive waveguide; and an active portion between the upstream passive portion and the downstream passive portion. The active portion comprises an active waveguide and electrical contacts in electrical communication with the active waveguide. The active waveguide comprises an upstream taper and/or a downstream taper. The upstream taper is configured to optically couple the active waveguide to the passive waveguide of the upstream portion and the downstream taper is configured to optically couple the active waveguide to the continuation of the passive waveguide of the downstream portion.

18 Claims, 15 Drawing Sheets

(56) References Cited

U.S. PATENT DOCUMENTS

Figure 1:
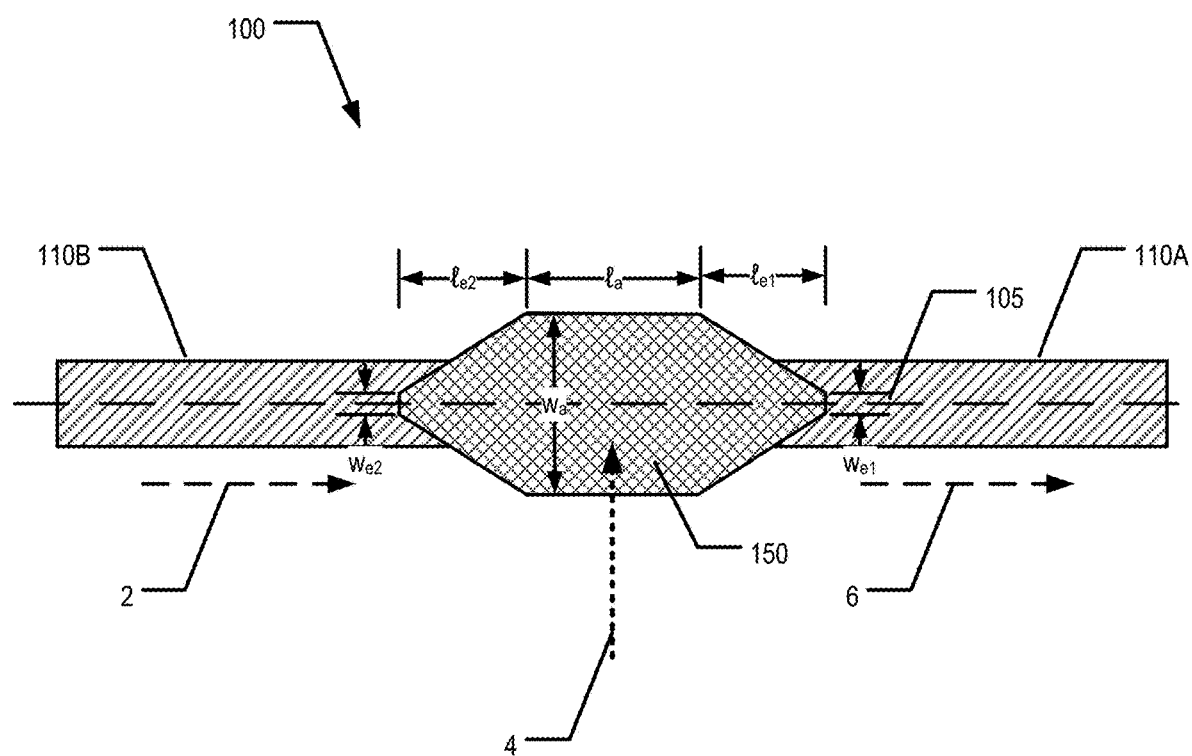

| | | | |
|---|---|---|---|
| 2002/0131745 A1* | 9/2002 | Azarbar | G02F 1/225 |
| | | | 385/129 |
| 2002/0172464 A1 | 11/2002 | Delwala | |
| 2006/0158230 A1 | 7/2006 | Rahman | |
| 2009/0231686 A1* | 9/2009 | Atkins | G02F 1/0353 |
| | | | 359/341.3 |
| 2009/0297094 A1 | 12/2009 | Hochberg et al. | |
| 2009/0324163 A1* | 12/2009 | Dougherty | B82Y 20/00 |
| | | | 385/14 |
| 2016/0109731 A1* | 4/2016 | Huang | G02B 6/12002 |
| | | | 385/3 |
| 2016/0357036 A1* | 12/2016 | Shi | G02B 6/2813 |
| 2018/0081204 A1* | 3/2018 | Ma | G02F 1/0027 |

OTHER PUBLICATIONS

Weigel et al., Hybrid Lithium Niobate and Silicon Photonic Waveguides, [article, online], 2015, [retrieved Feb. 24, 2020], URL: https://arxiv.org/abs/1510.01777, 16 pages.

Chremmos et al., "Reflective properties of double-ring resonator system coupled to a waveguide," in IEEE Photonics Technology Letters, vol. 17, No. 10, pp. 2110-2112, Oct. 2005, doi: 10.1109/LPT.2005.854346.

Extended European Search Report issued in European Application No. 20202442.8 dated Mar. 12, 2021, 8 pages.

Xu et al., "Cascaded silicon micro-ring modulators for WDM optical interconnection," vol. 14, Issue 20, pp. 9431-9436 (2006) •https://doi.org/10.1364/OE.14.009431.

\* cited by examiner

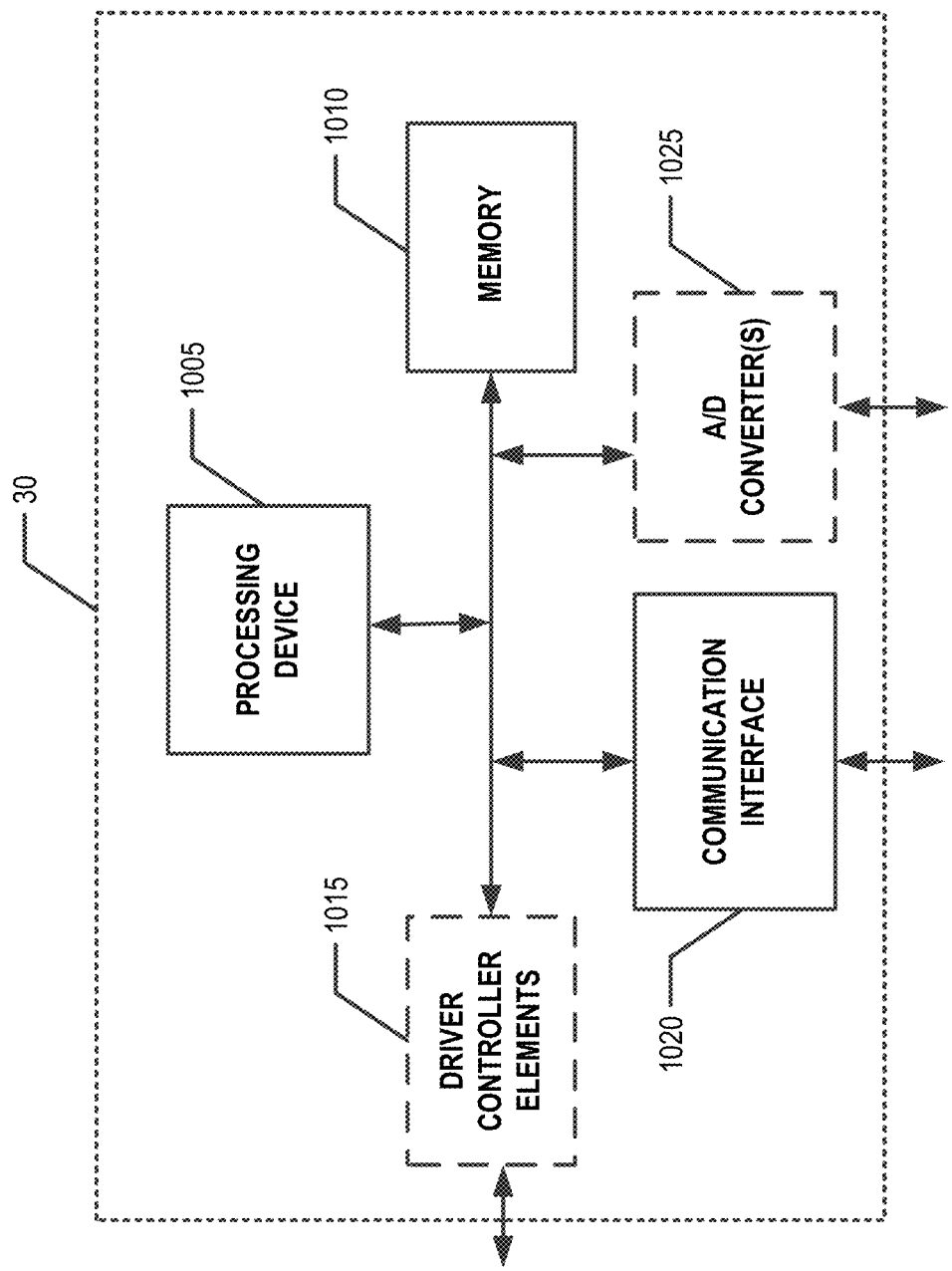

INTEGRATED ACTIVE/PASSIVE VISIBLE/UV MODULATOR

TECHNICAL FIELD

Various embodiments relate to integrated active/passive modulators for visible and/or ultraviolet (UV) wavelengths and methods of fabrication thereof.

BACKGROUND

In various applications, photonic beams may be modulated. Such modulation may include switching the intensity of the photonic beams on and off, temporal power shaping, feedback, phase modulation, and frequency modulation. Such photonic beam modulation is often accomplished using free space acoustic-optics modulators (AOMs) and/or free space electro-optic modulators (EOMs). Through applied effort, ingenuity, and innovation many deficiencies of such systems have been solved by developing solutions that are structured in accordance with the embodiments of the present invention, many examples of which are described in detail herein.

BRIEF SUMMARY OF EXAMPLE EMBODIMENTS

Example embodiments provide integrated active/passive modulators for visible and/or ultraviolet (UV) wavelengths. Example embodiments provide integrated active/passive modulator units, integrated active/passive modulators comprising one or more integrated passive/active modulator units, corresponding methods of fabrication and/or use, and/or the like. Various embodiments provide integrated active/passive modulators for use with wavelengths in the range of approximately 350-1000 nm.

According to one aspect, an integrated passive/active modulator unit is provided. In an example embodiment, an integrated passive/active modulator unit comprises an upstream passive portion comprising a passive waveguide; a downstream passive portion comprising a continuation of the passive waveguide; and an active portion between the upstream passive portion and the downstream passive portion. The active portion comprises an active waveguide and electrical contacts in electrical communication with the active waveguide. The active waveguide comprises at least one of (a) an upstream taper or (b) a downstream taper. If present, the upstream taper is configured to optically couple the active waveguide to the passive waveguide of the upstream portion. If present, the downstream taper is configured to optically couple the active waveguide to the continuation of the passive waveguide of the downstream portion.

In an example embodiment, the active waveguide is made of a first material, the first material characterized by the refractive index of the first material changing in response to an electrical signal applied to the electrical contacts. In an example embodiment, the first material comprises at least one of lithium niobite ($LiNbO_3$), zirconium dioxide ($ZrO_2$) doped $LiNbO_3$, lithium tantalite ($LiTaO_3$), magnesium oxide (MgO) doped $LiTaO_3$, or barium titanate ($BaTiO_3$). In an example embodiment, the passive waveguide is made of second material comprising at least one of aluminium oxide ($Al_2O_3$), silicon nitride ($Si_3N_4$), hafnium dioxide ($HfO_2$), aluminium nitride (AlN), or tantalum pentoxide ($Ta_2O_5$). In an example embodiment, the upstream passive portion, the downstream passive portion, and the active portion further comprise a first cladding layer disposed between a substrate and the passive waveguide and a second cladding layer that, with the first cladding layer, encloses the passive waveguide. In an example embodiment, the first and second cladding layers are oxide layers. In an example embodiment, the upstream taper and/or downstream taper extends outward along a unit axis defined by a beam propagation direction through the integrated passive/active modulator unit; in the upstream taper, the active waveguide widens from a upstream taper end width at the upstream end of the active waveguide to a primary active waveguide width at a central region of the active waveguide; and in the downstream taper, the active waveguide narrows from the primary active waveguide width at the central region of the active waveguide to a downstream taper end width.

According to another aspect, an integrated passive/active modulator is provided. In an example embodiment, an integrated passive/active modulator comprises at least one passive/active modulator unit and at least one additional passive waveguide. The at least one passive/active modulator unit comprises an upstream passive portion comprising a passive waveguide; a downstream passive portion comprising a continuation of the passive waveguide; and an active portion between the upstream passive portion and the downstream passive portion. The active portion comprises an active waveguide and electrical contacts in electrical communication with the active waveguide. The active waveguide comprises at least one of (a) an upstream taper or (b) a downstream taper. If present, the upstream taper is configured to optically couple the active waveguide to the passive waveguide of the upstream portion. If present, the downstream taper is configured to optically couple the active waveguide to the continuation of the passive waveguide of the downstream portion. The at least one additional passive waveguide is optically coupled to the upstream passive portion and the downstream passive portion via one or more beam splitters and/or beam combiners.

In an example embodiment, the at least one passive/active modulator unit comprises a pair of passive active/modulator units coupled to one another in parallel. In an example embodiment, the at least one passive/active modulator unit comprises two or more pairs of passive active/modulator units, each pair of passive/active modulator units coupled in parallel, and a first pair of passive/active modulator units serially coupled to a second pair of passive/active modulator units. In an example embodiment, the at least one unit is formed into a ring such that both the upstream passive portion and the downstream passive portion are coupled to a same additional passive waveguide. In an example embodiment, the at least one additional passive waveguide comprises a through passive waveguide and a ring passive waveguide, the ring passive waveguide is configured to couple light into and out of the through passive waveguide, and the at least one unit is formed into a ring such that both the upstream passive portion and the downstream passive portion are coupled to the ring passive waveguide. In an example embodiment, the at least one integrated passive/active modulator unit comprises at least two integrated passive/active modulator units each formed into a ring such that both the upstream portion and the downstream portion of a first unit of the at least two integrated passive/active modulator units are coupled to a same additional passive waveguide and both the upstream portion and the downstream portion of a second unit of the at least two integrated passive/active modulator units are coupled to the same additional passive waveguide, and the first unit and the second unit are serially coupled to the same additional passive waveguide. In an example embodiment, the integrated passive/active modulator is configured to provide a combined output beam that can be modulated between a high intensity/on state and a low intensity/off state with a frequency of at least approximately 100 MHz. In an example embodiment, the integrated passive/active modulator is configured to provide a combined output beam that has an extinction ratio between a high intensity/on state and a low intensity/off state of at least approximately 40 dB.

According to still another aspect, a method of fabricating an integrated passive/active modulator is provided. In an example embodiment, the method comprises depositing a first cladding layer on a substrate; depositing a passive waveguide layer on the first cladding layer and patterning the passive waveguide layer to provide a passive waveguide; depositing a second cladding layer on the passive waveguide and the first cladding layer so as to enclose the passive waveguide; defining an active portion of an integrated passive/active modulator unit by bonding an active layer to a portion of the second cladding layer; etching the active layer to form an active waveguide comprising at least one of an upstream taper or a downstream taper; and depositing and patterning electrical contacts in electrical communication with the active waveguide.

In an example embodiment, the method further comprises depositing a third cladding layer on the active portion; and etching via openings in the third cladding layer, wherein the electrical contacts are at least partially disposed within the via openings. In an example embodiment, the active layer is made of a first material, the first material characterized by the refractive index of the first material changing in response to an electrical signal applied to the electrical contacts. In an example embodiment, the first material comprises at least one of $LiNbO_3$, $ZrO_2$ doped $LiNbO_3$, $LiTaO_3$, MgO doped $LiTaO_3$, or $BaTiO_3$. In an example embodiment, the passive waveguide is made of second material comprising at least one of $Al_2O_3$, $Si_3N_4$, $HfO_2$, AlN, or $Ta_2O_5$. In an example embodiment, the passive waveguide layer and/or the active waveguide layer is/are patterned to form a passive waveguide and/or active waveguide, respectively, having a cross-sectional area in a cross-section taken substantially perpendicular to a unit axis of the integrated passive/active modulator where the cross-sectional area is configured such that when a photonic beam characterized by a wavelength in a range of approximately 350-1000 nm and having a power in a range of approximately 100-300 mW propagates through and/or is modulated by the integrated passive/active modulator, the intensity of the photonic beam in a unit area of the passive waveguide and/or active waveguide is less than a damage threshold intensity for a material of the passive waveguide and/or active waveguide, respectively.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 provides block diagram of an example integrated passive/active modulator unit, in accordance with an example embodiment.

Figure 2:
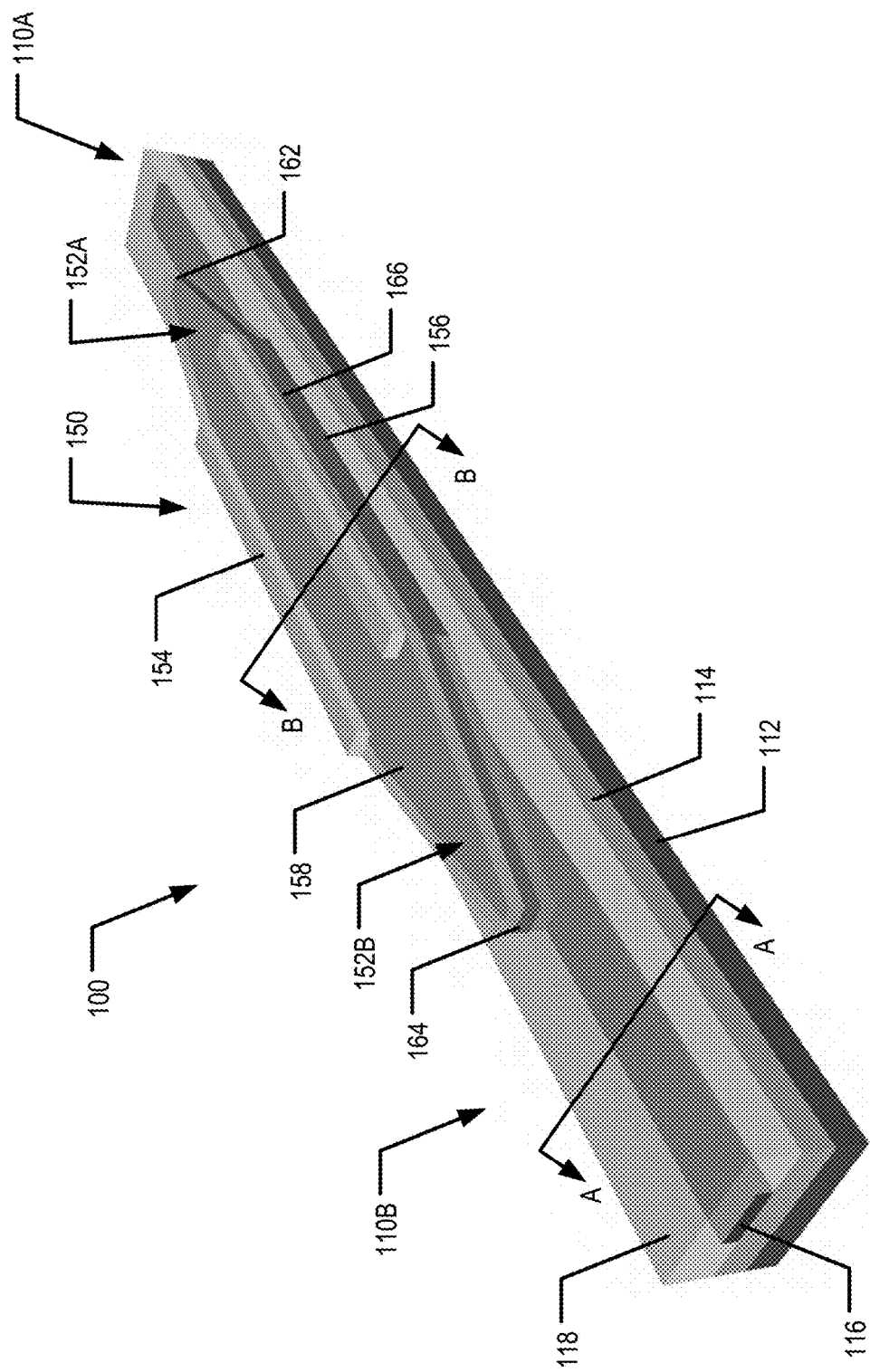

FIG. 2 provides a perspective view of an example integrated passive/active modulator unit, in accordance with an example embodiment.

Figure 3:
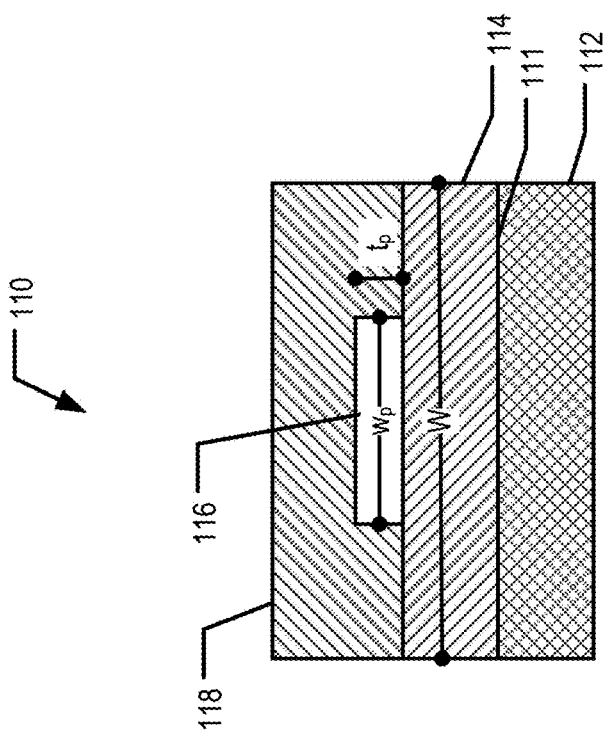

FIG. 3 provides a cross-sectional view of a passive portion of the example integrated passive/active modulator unit taken at line AA of FIG. 2, in accordance with an example embodiment.

Figure 4:
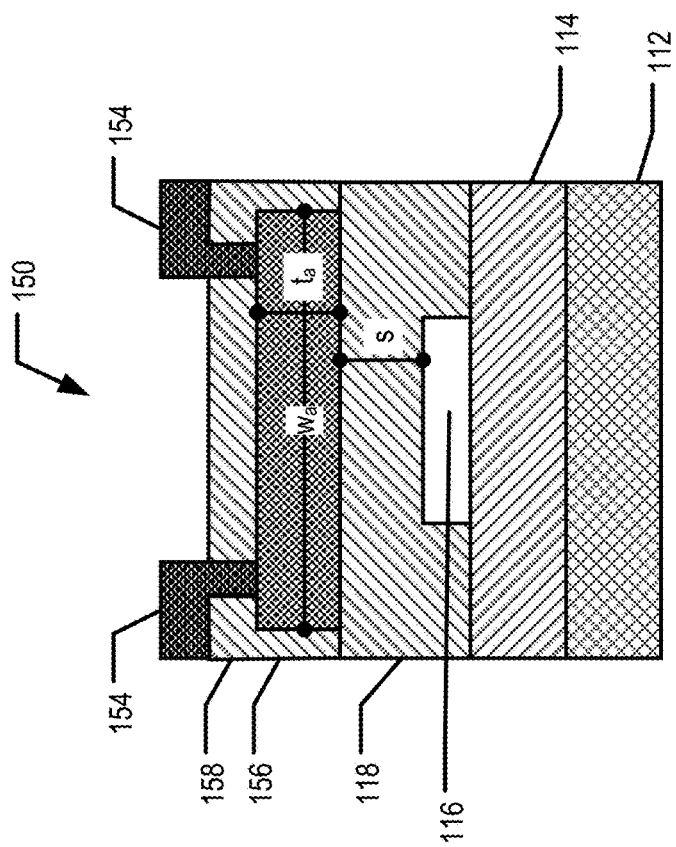

FIG. 4 provides a cross-sectional view of an active portion of the example integrated passive active modular unit taken at line BB of FIG. 2, in accordance with an example embodiment.

Figure 5:
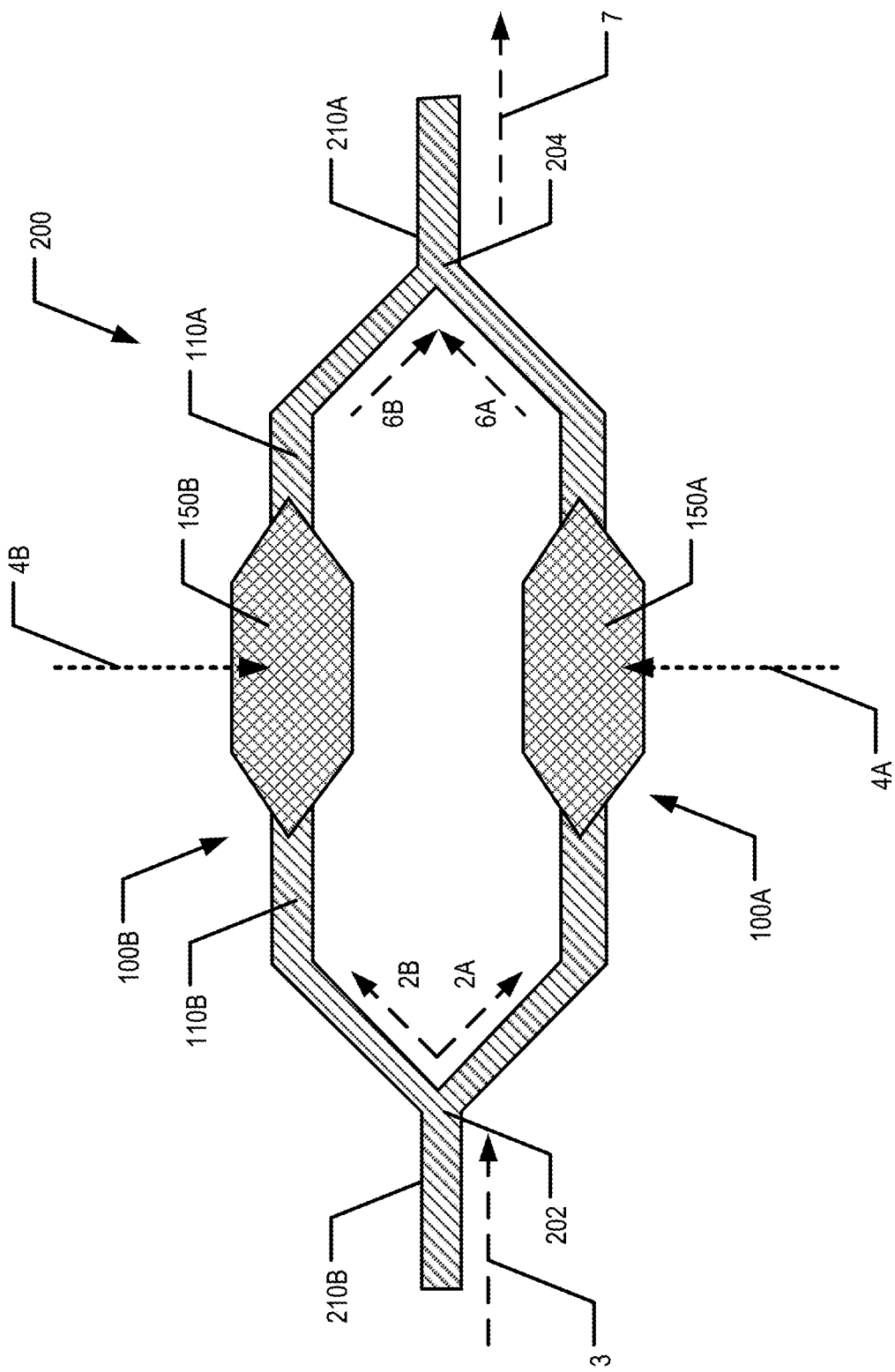

FIG. 5 provides a schematic diagram of a Mach-Zehnder Interferometer (MZI) modulator comprising two integrated passive/active modulator units, in accordance with an example embodiment.

Figure 6:
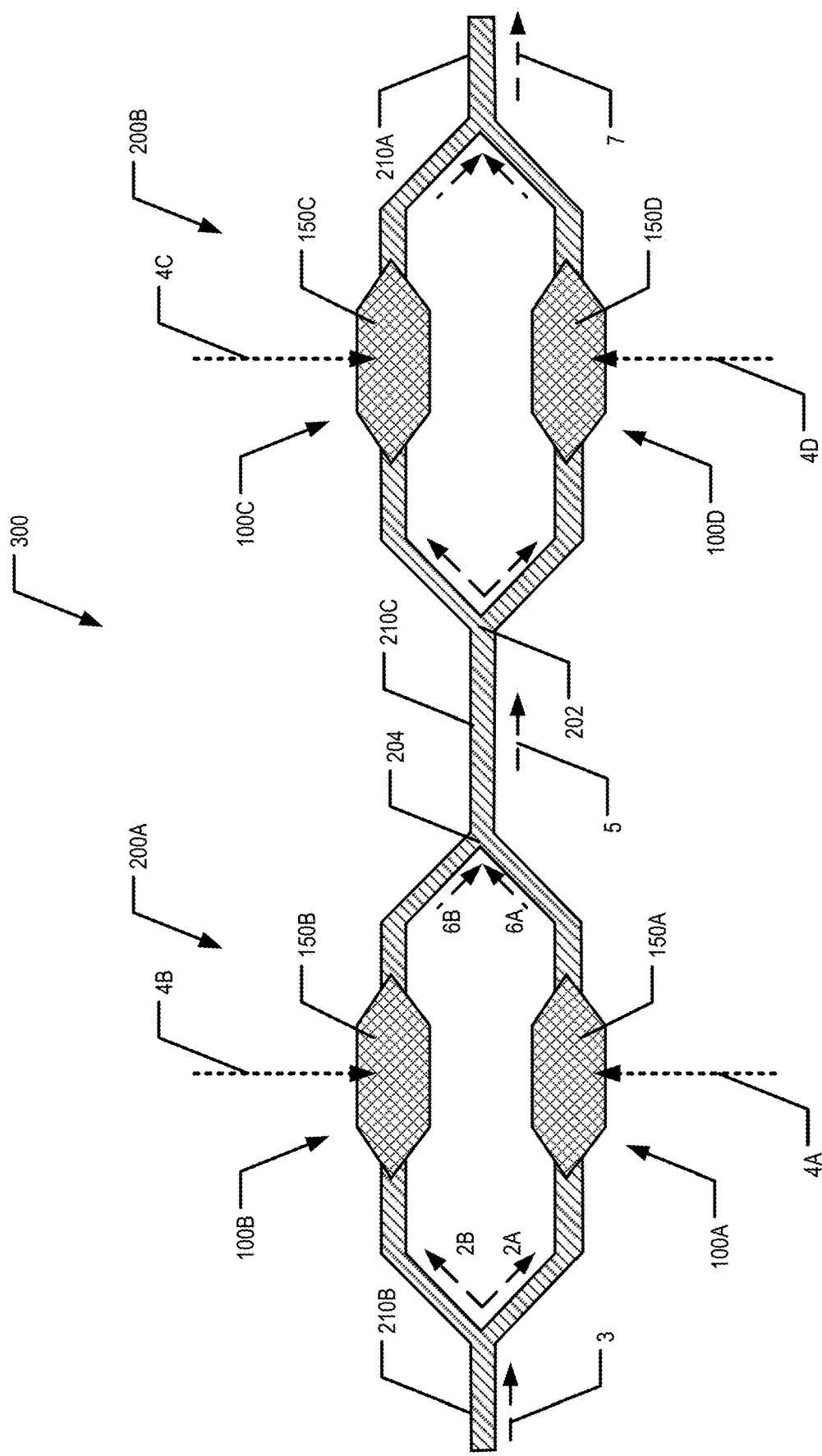

FIG. 6 provides a schematic diagram of a cascaded MZI modulator comprising four integrated passive/active modular units, in accordance with an example embodiment.

Figure 7:
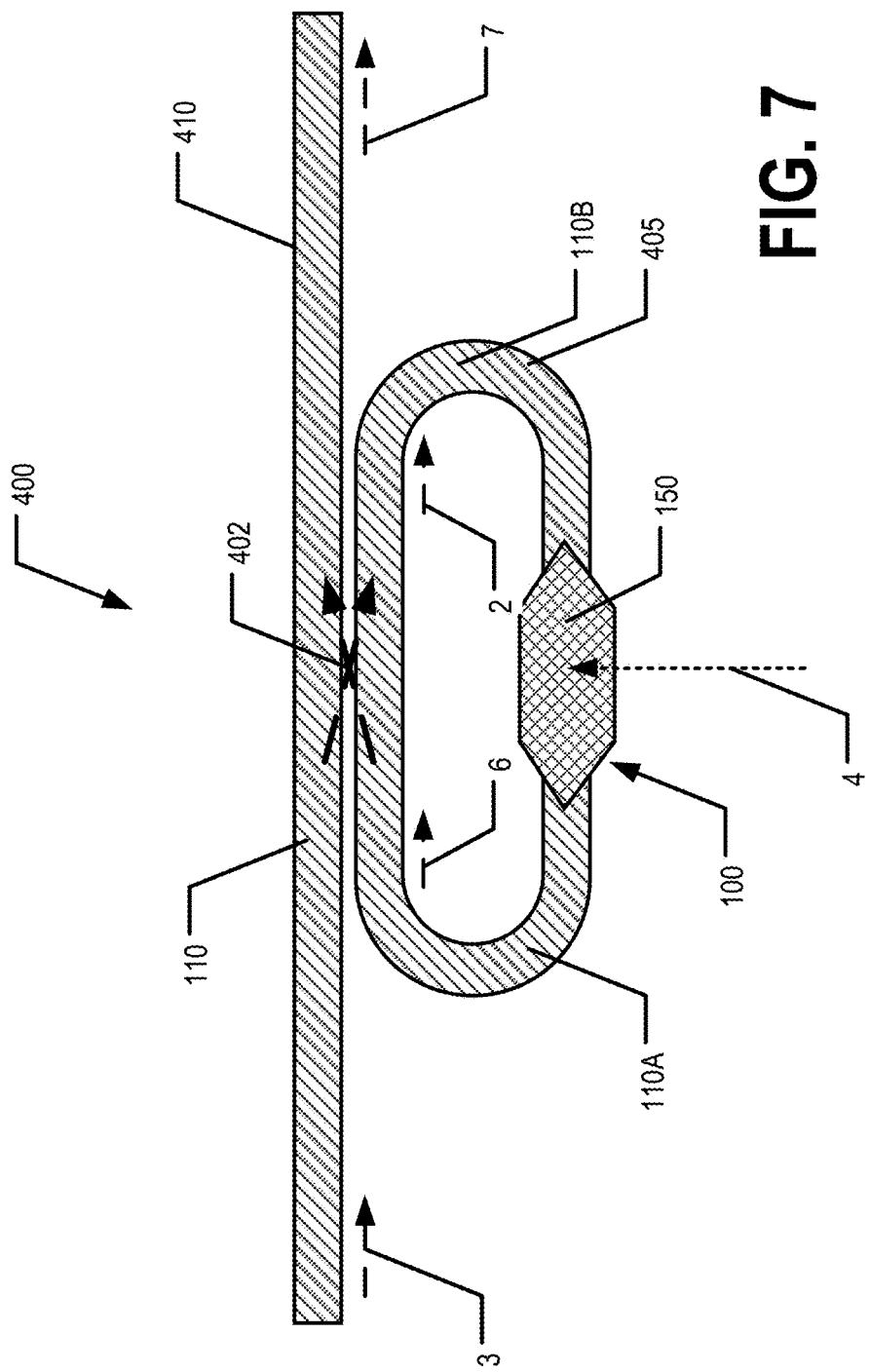
Figure 8:
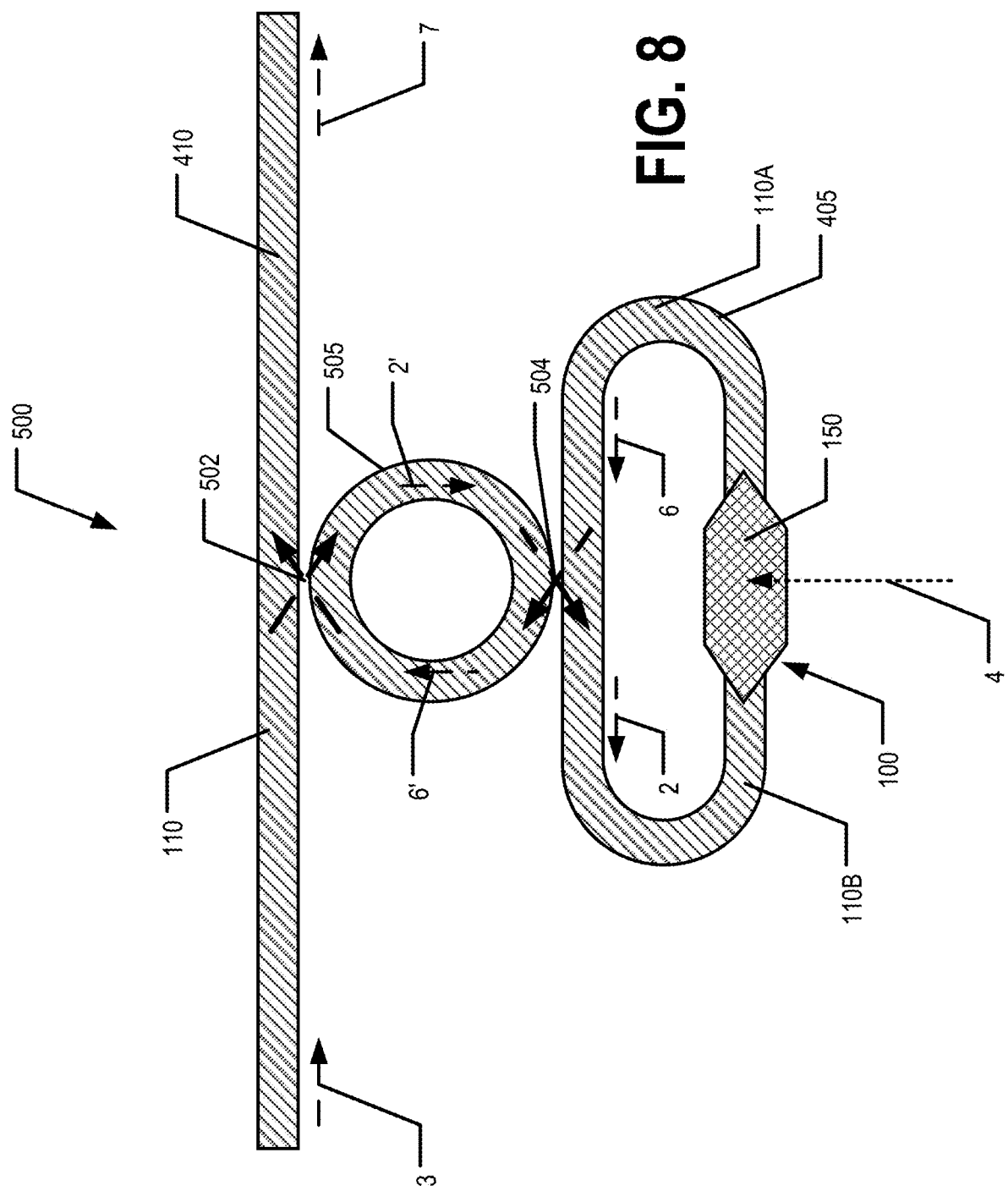

FIG. 7 provides a schematic diagram of a ring modulator comprising an integrated passive/active modulator unit, in accordance with an example embodiment;

FIG. 8 provides a schematic diagram of a cascaded ring modulator comprising an integrated passive/active modulator unit, in accordance with an example embodiment.

Figure 9:
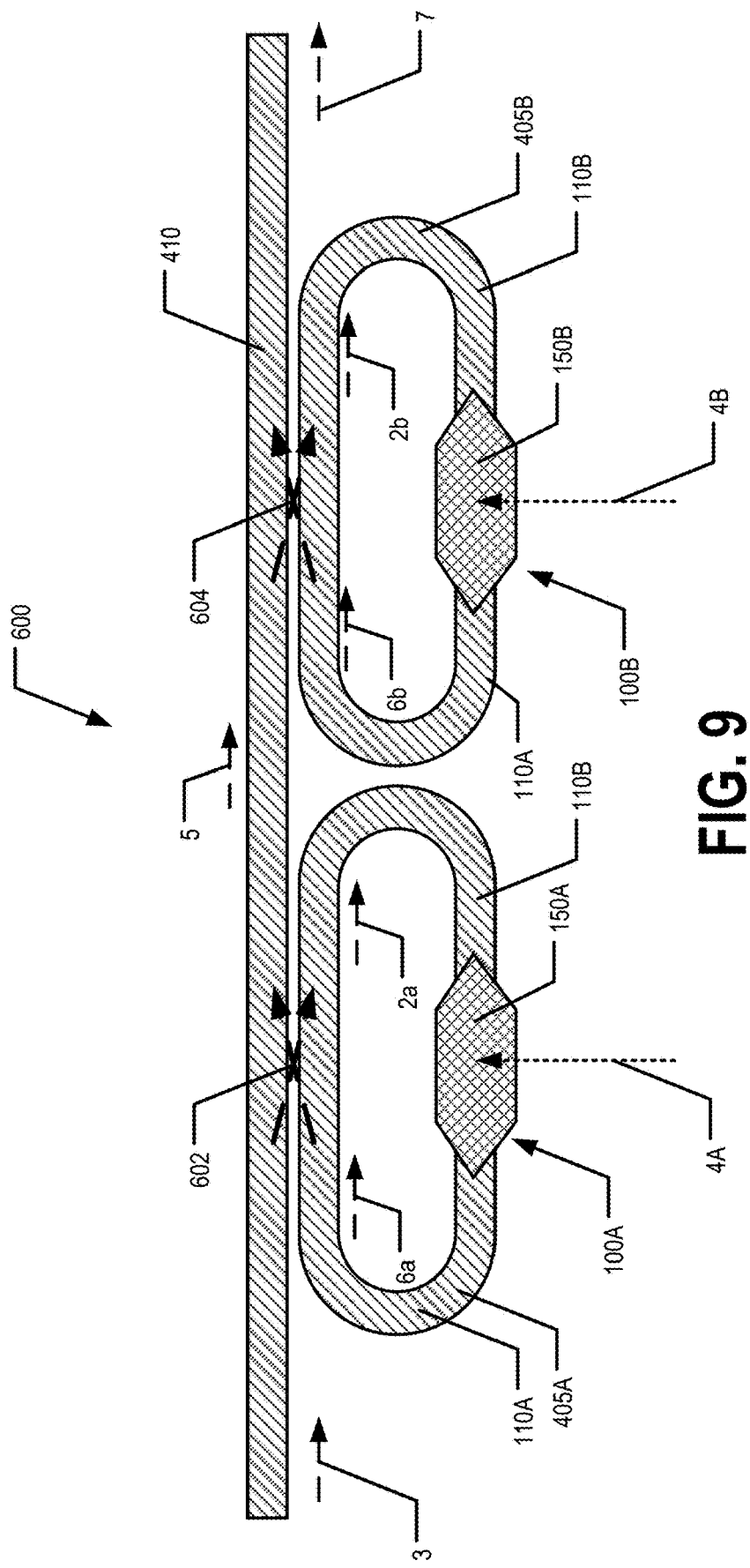

FIG. 9 provides a schematic diagram of a parallel ring modulator comprising two integrated passive/active modulator units, in accordance with an example embodiment.

Figure 10:
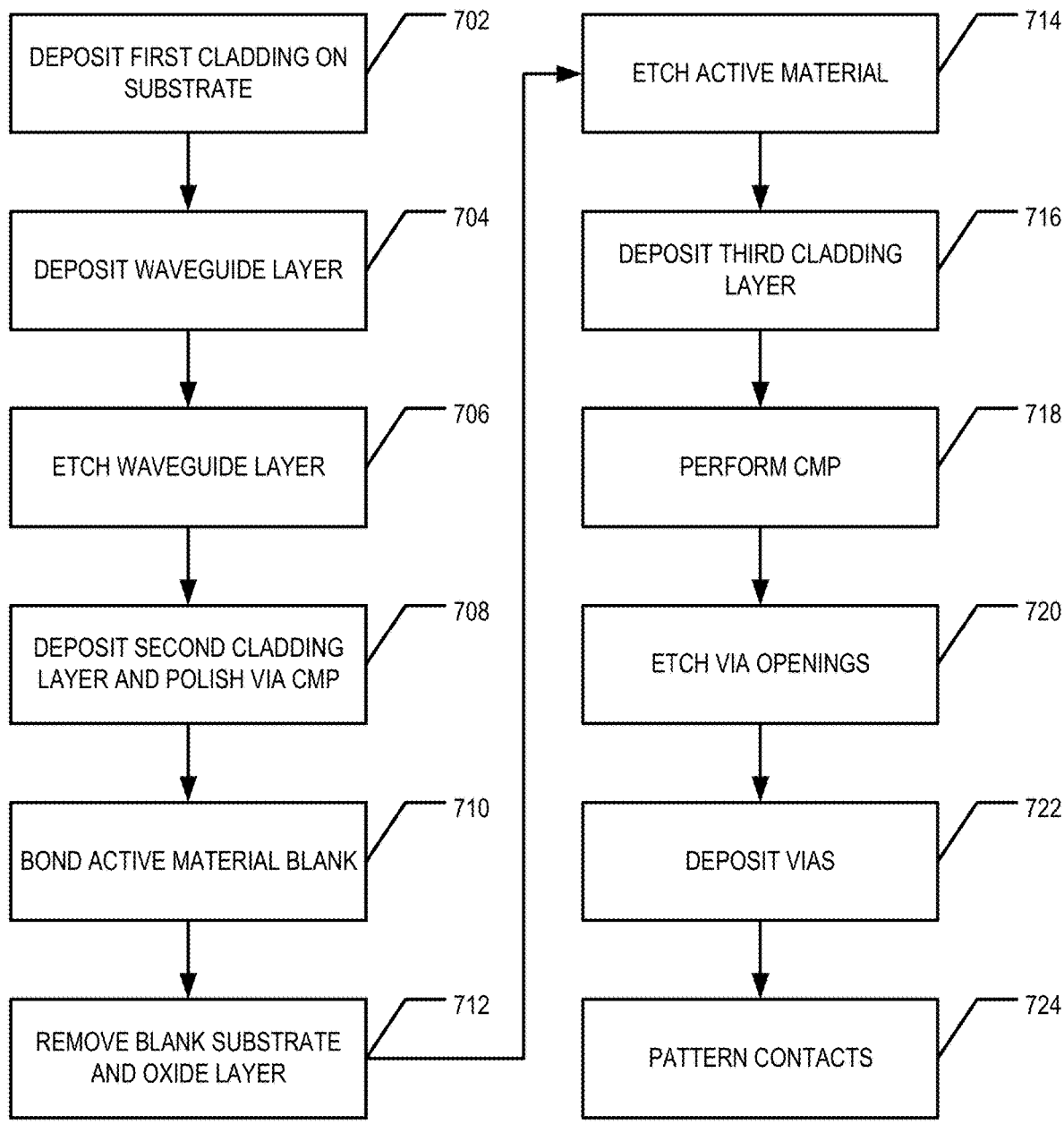

FIG. 10 provides a flowchart illustrating various processes, procedures, and/or operations performed in fabricating an integrated passive/active modulator unit, in accordance with an example embodiment.

FIGS. 11A-11E provide cross-sectional views of various stages of fabricating an integrated passive/active modulator unit, in accordance with an example embodiment.

Figure 12:
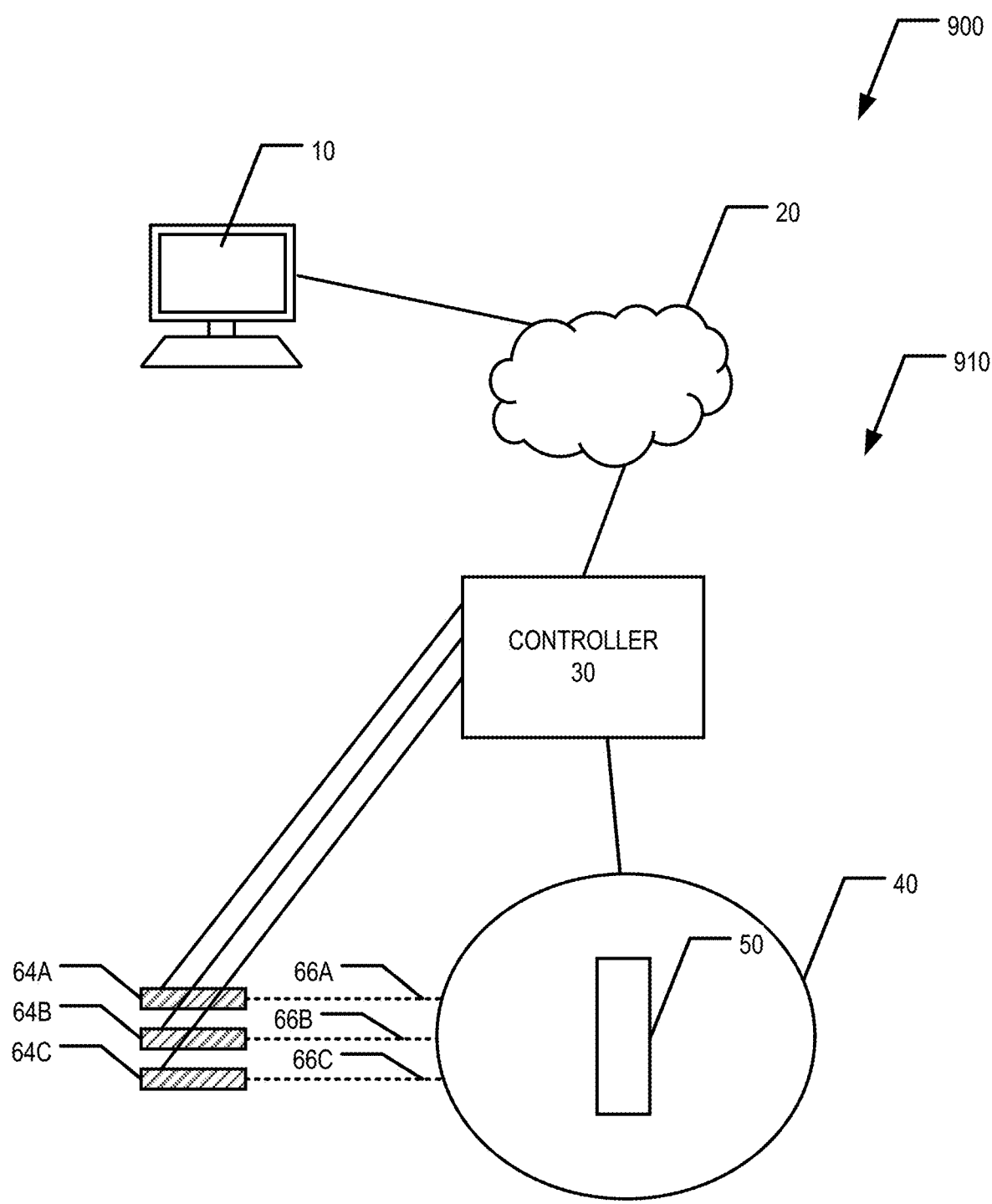

FIG. 12 provides a block diagram of an example trapped ion quantum computer comprising an integrated passive/active modulator unit of an example embodiment.

Figure 13:
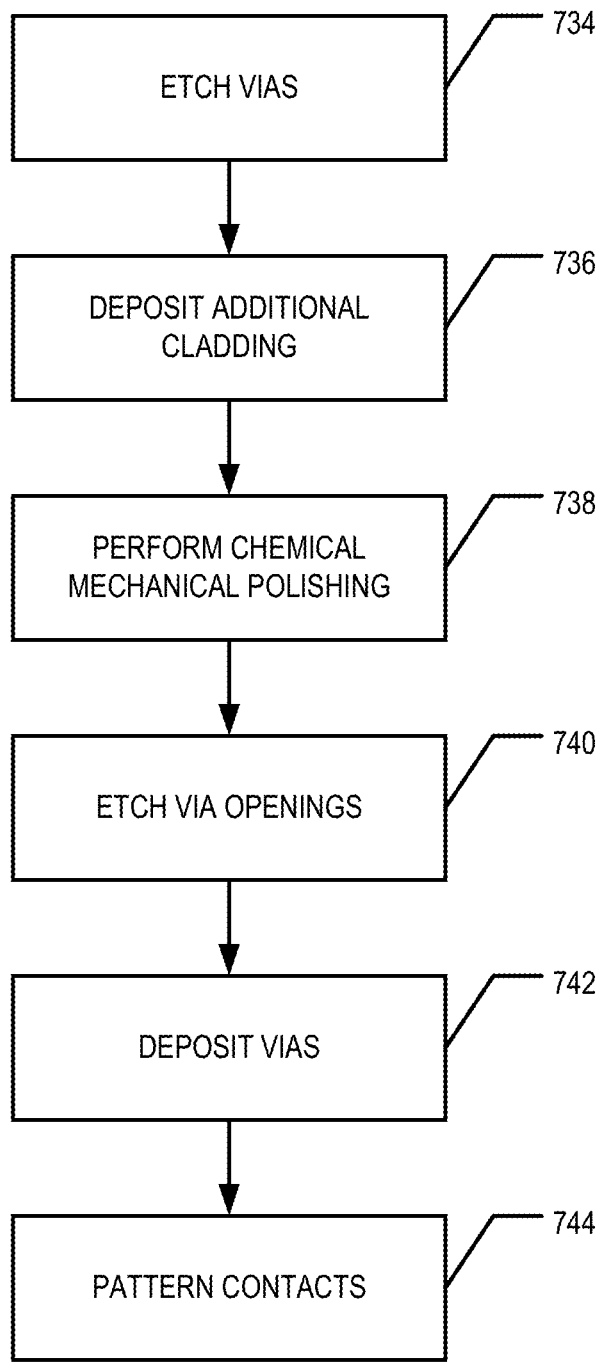

FIG. 13 provides a flowchart illustrating various processes, procedures, and/or operations performed in integrating an integrated passive/active modulator unit with an ion trap of a trapped ion quantum computer, in accordance with an example embodiment.

Figure 14A:
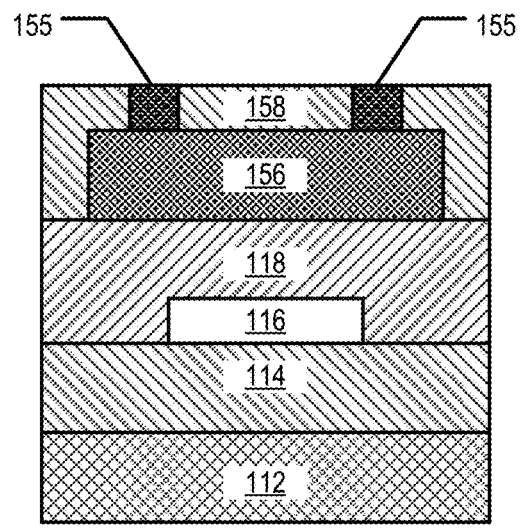
Figure 14B:
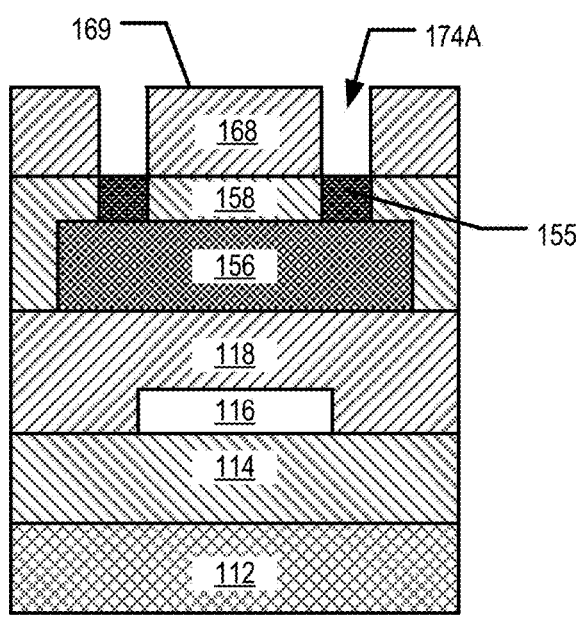
Figure 14C:
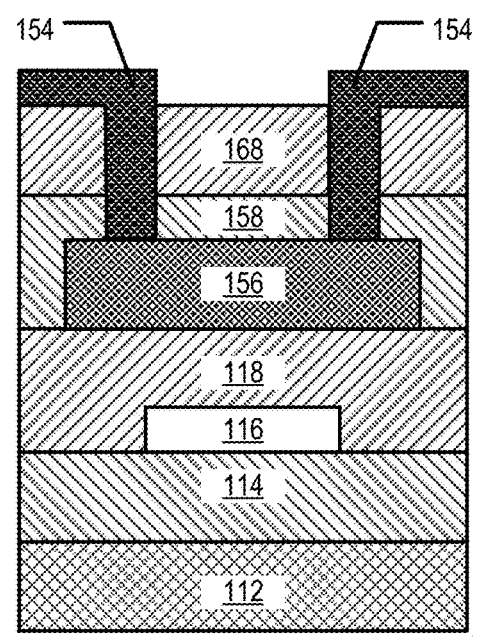

FIGS. 14A-14C provide cross-sectional views of various stages of integrating an integrated passive/active modulator unit with an ion trap of a trapped ion quantum computer, in accordance with an example embodiment.

FIG. 15 provides a schematic diagram of an example controller of a quantum computer comprising an ion trap apparatus, in accordance with an example embodiment.

Figure 16:
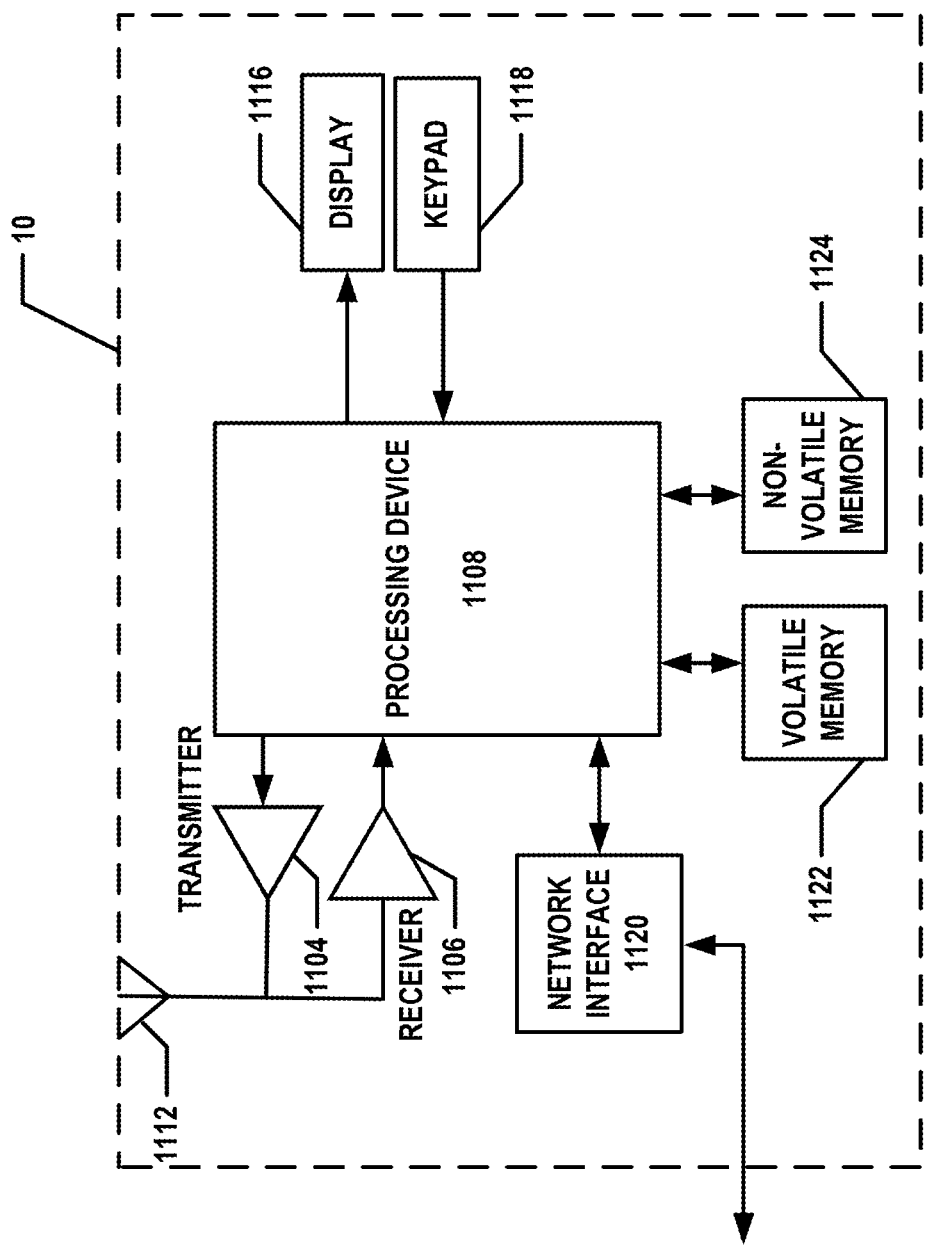

FIG. 16 provides a schematic diagram of an example computing entity of a quantum computer system that may be used in accordance with an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally" and "approximately" refer to within engineering and/or manufacturing limits and/or within user measurement capabilities, unless otherwise indicated. Like numbers refer to like elements throughout.

In various scenarios, it may be desired to provide a photonic beam that is modulated such that the intensity of the beams is rapidly switched between an on/high intensity and an off/low intensity. For example, the photonic beam may be provided to a target. Provision of such a photonic beam is often accomplished using free space optics and free space AOMs. In an example embodiment, the target is a qubit of a quantum computer. For example, the target may be an ion trapped in an ion trap (e.g., of a trapped ion quantum computer) and the photonic beam may be used to ionize an atom being loaded into the ion trap, initialize an ion within the ion trap into a known quantum state, perform a quantum logic gate on an ion within the ion trap, perform cooling of an ion within the ion trap, re-pump an ion within the ion trap, and/or the like.

In various scenarios, these free space optics and free space AOMs may be replaced with various embodiments of integrated passive/active modulators. In various embodiments, the use of integrated passive/active modulators may reduce the physical space required to house the optical equipment providing the optical paths for the photonic beams to be delivered to the target. This may permit the loading of more targets into a target space. For example, use of the integrated passive/active modulators of various embodiments may enable additional ions to be loaded into the ion trap.

In various embodiments, the photonic beams are high powered beams and the integrated passive/active modulators are configured to provide the beams with very low loss. In various embodiments, the integrated passive/active modulators are configured to provide a large ratio between the on/high intensity state and the off/low intensity state of the provided photonic beam. In various embodiments, the integrated passive/active modulators are configured to modulate the intensity of the photonic beam rapidly. In various embodiments, the integrated passive/active modulators are configured to modulate photonic beams characterized by visible and/or UV wavelengths.

FIG. 1 illustrates an example embodiment of a passive/active modulator unit 100 (referred to herein as a unit 100). In various embodiments, a unit 100 comprises an upstream passive portion 110B, an active portion 150, and a downstream passive portion 110A. In various embodiments, the upstream passive portion 110B is configured for delivering an input photonic beam 2 to an active portion 150. The active portion 150 receives electrical signal 4, which causes the active portion 150 to modulate the input photonic beam 2 to provide a modulated output photonic beam 6. The downstream passive portion 110A provides the output photonic beam 6 to a target or additional downstream optics. In various embodiments, the active portion is tapered in at least one of the upstream or downstream directions. For example, an upstream taper and/or a downstream taper of the active portion 150 may act as an optical interface between the passive waveguide of the passive portions 110 and the active waveguide of the active portion 150. The photon beams are shown in FIGS. 1 and 5-9 as dashed lines.

FIG. 2 provides a perspective view of an example unit 100. FIG. 3 provides a cross-sectional view of the unit 100 taken at line AA of FIG. 2 and FIG. 4 provides a cross-sectional view of the unit taken at line BB of FIG. 2. For example, FIG. 3 provides a cross-sectional view of a passive portion 110 (e.g., 110A, 110B) and FIG. 4 provides a cross-sectional view of an active portion 150. In various embodiments, the cross-sectional views shown in FIGS. 3 and 4 are taken in planes substantially perpendicular to the unit axis 105. In various embodiments, the unit 100 comprises a substrate 112 upon which the various elements of the unit 100 are fabricated. A first cladding layer 114 is disposed and/or deposited on the substrate 112. For example, the first cladding layer 114 may be directly disposed on the substrate 112. For example, the first cladding layer 114 may be an oxide and/or dielectric layer. For example, the first cladding layer 114 may be made of $SiO_2$, in an example embodiment.

In various embodiments, the first cladding layer 114 is sandwiched between the passive waveguide 116 and the substrate 112. In various embodiments, the passive waveguide 116 is disposed and/or deposited on the first cladding layer 114. In various embodiments, the passive waveguide 116 is made of $Al_2O_3$, $Si_3N_4$, $HfO_2$, AlN, and/or $Ta_2O_5$. As shown in FIG. 3, the passive waveguide 116 has a width $w_p$ in a direction substantially perpendicular to the unit axis 105 and substantially parallel to the surface 111 of the substrate 112 and a thickness $t_p$ in a direction substantially perpendicular to both the unit axis 105 and the surface 111 of the substrate 112. In various embodiments, the passive waveguide 116 is made of a material having a refractive index that allows for propagation of a photonic beam through the passive waveguide 116 with only a small amount of loss (e.g., via dissipation and/or leakage). In various embodiments, the waveguide 116 may define a unit axis 105 such that a photonic beam (e.g., input photonic beam 2 and/or output photonic beam 6) travels through the unit 100 in a direction substantially parallel to the unit axis 105.

In various embodiments, a second cladding layer 118 is disposed and/or deposited partially on the passive waveguide 116 and partially on the first cladding layer 114. For example, the second cladding layer 118 and first cladding layer 114 may enclose passive waveguide 116 in directions radially extending from the unit axis 105. The first and second cladding layers 114, 118 have a width W in a direction substantially perpendicular to the unit axis 105 and the substantially parallel to the surface 111 of the substrate 112. In various embodiments, the width $w_p$ is smaller than the width W of the second cladding layer 118 and the first cladding layer 114 such that the passive waveguide 116 is enclosed by the first and second cladding layers 114, 118 in directions radial to the unit axis 105. In various embodiments, the second cladding layer 118 is an oxide and/or dielectric layer. For example, the second cladding layer 118 may be made of $SiO_2$, in an example embodiment.

In various embodiments, the passive portions 110A, 110B of unit 100 do not comprise any active components. In various embodiments, the active portion 150 comprises active components configured to cause modulation of a photon beam passing through the active portion 150. As shown in FIG. 4, the active portion 150 comprises the substrate 112, the first cladding layer 114, the passive waveguide 116, and the second cladding layer 118. In various embodiments, the substrate 112, the first cladding layer 114, the passive waveguide 116, and the second cladding layer 118 are continuous from the upstream passive portion 110B, active portion 150, and the downstream passive portion 110A. For example, a photon beam passing through the upstream passive portion 110B to the active portion 150 will not experience a seam in the passive waveguide 116 material and/or first and/or second cladding layers 114, 118 between the upstream passive portion 110B and the active portion 150. Similarly, a photon beam passing from the active portion 150 to the downstream passive portion 110A will not experience a seam in the passive waveguide 116 material and/or first and/or second cladding layers 114, 118 between the active portion 150 and the downstream passive portion 110A.

In various embodiments, the active portion 150 further comprises active waveguide 156. In various embodiments, the active waveguide 156 is disposed and/or deposited on the second cladding layer 118. For example, the active waveguide 156 may disposed and/or deposited directly onto the second cladding layer 118. In various embodiments, the active waveguide 156 is made of a material that, when an electrical signal is applied thereto, the refractive index thereof changes. For example, in various embodiments, the active waveguide 156 is made of $LiNbO_3$, $LiTaO_3$, or $BaTiO_3$. As shown in FIG. 4, the active waveguide 156 has a primary active waveguide width $w_a$ in a direction substantially perpendicular to the unit axis 105 and substantially parallel to the surface 111 of the substrate 112 and a thickness $t_a$ in a direction substantially perpendicular to both the unit axis 105 and the surface 111 of the substrate 112. The active waveguide 156 and the passive waveguide 116 are separated by a separation distance s. In various embodiments, the separation distance s is measured in a direction substantially perpendicular to both the unit axis 105 and the surface 111 of the substrate 112. In various embodiments, the separation distance s is the thickness of the layer of the second cladding layer 118 between the passive waveguide 116 and the active waveguide 156.

In various embodiments, a third cladding layer 158 is disposed and/or deposited on the active waveguide 156. In an example embodiment, the primary active waveguide width $w_a$ of the active waveguide 156, at least along a portion of the length (e.g., in a direction substantially parallel to the unit axis 105) of the action portion 150, is less than the width W of the first, second, and third cladding layers 114, 118, 158 and the third cladding layer 158 is disposed and/or deposited on the active waveguide 156 and the second cladding layer 118. In various embodiments, the third cladding layer 158 is an oxide and/or dielectric layer. For example, the third cladding layer 158 may be made of $SiO_2$, in an example embodiment.

In various embodiments, the unit 100 further comprises electrical contacts 154. For example, via openings may be etched into the third cladding layer 158 and electrical contacts 154 may be deposited into the via openings. For example, the electrical contacts 154 may be in electrical communication with the active waveguide 156. For example, an electrical signal 4 may be applied to the electrical contacts 154 to cause the refractive index of the active waveguide 156 to change in response to the electrical signal 4. In various embodiments, the electrical contacts 154 are made of a conductive material such as copper, gold, silver, and/or the like.

The refractive index n of a material is defined as n≡c/v, where c is the speed of light in a vacuum and v is the phase velocity of light in the material. The phase velocity v is the rate at which the phase of the light evolves within the material. Thus, the phase of a photonic beam evolves differently when traveling through a material with a first refractive index compared to when traveling through a material with a second refractive index, where the first and second refractive indices are different from one another. Thus, by applying an electrical signal 4 to the active waveguide 156 (e.g., via the electrical contacts 154), the refractive index of the active waveguide 156 may be changed which causes the phase evolution of a photon beam propagating therethrough to change.

In various embodiments, the length of the active portion 150 is known. For example, the downstream taper length $\ell_{e1}$, upstream taper length $\ell_{e2}$, and central region taper length $\ell_a$ may be known from the manufacturing and/or fabrication process. In various embodiments, the downstream taper length $\ell_{e1}$, upstream taper length $\ell_{e2}$, and central region taper length $\ell_a$ are known to a high level of accuracy from the design, manufacturing, and/or fabrication processes. The voltage of the electrical signal 4 applied to the active waveguide 156 via the electrical contacts 154 may be controlled to cause the desired amount of phase shifting of an input photon beam 2 to provide an output beam 6 having the desired phase shift. In various embodiments, the control of the voltage of the electrical signal 4 is informed by the knowledge of the downstream taper length $\ell_{e1}$, upstream taper length $\ell_{e2}$, and/or central region taper length $\ell_a$.

In various embodiments, an input photon beam 2 may be coupled into the passive waveguide 116 of the upstream passive portion 110B of a unit 100. In various embodiments, the input photon beam 2 may be a continuous wave laser and/or other photon beam source. The phase of the input photon beam 2 will evolve as the input photon beam 2 propagates through the passive waveguide 116 to the upstream taper 152B in accordance with the approximately constant refractive index of the passive waveguide 116. The input photon beam 2 is then coupled into the active waveguide 156 of the active portion 150 via the upstream taper 152B. The refractive index of the active waveguide 156 is controlled via the electrical signal 4 that is biasing the active waveguide 156 (e.g., via the electrical contacts 154). The phase of a photon beam propagating through the active waveguide 156 will evolve based on the refractive index the photon beam experiences therein. The phase of the output beam 6 may be different from an expected phase, where the expected phase is the phase the first input photon beam 2 would have if the first input photon beam had continued to propagate through the active region 150 without experiencing any phase evolution adjustment, modification, and/or change. For example, the electrical signal 4 may be used to control the amount of difference in phase between the input photon beam 2 and an output photon beam 6 and the how that amount of difference evolves over time. An output photon beam 6 is coupled into the passive waveguide 116 of the downstream passive portion 110A via the downstream taper 152A. The phase of the output photon beam 6 may then evolve as the output photon beam 6 propagates through the passive waveguide 116 of the downstream passive portion 110A in accordance with the approximately constant refractive index of the passive waveguide 116. The output photon beam 6 may then be coupled to another waveguide (e.g., 210, 410) or delivered to a target via the passive waveguide 116 of the downstream passive portion 110A.

In various embodiments, the input photon beam 2 and/or the output photon beam 6 may be a high power photon beam. For example, the input photon beam 2 and/or the output photon beam 6 (e.g., in a high intensity/on state) may have a power of 100 mW or greater.

In various embodiments, the active portion 150 comprises an upstream taper 152B and a downstream taper 152A. For example, at the downstream end 164 of the active portion 150, the active waveguide 156 has a downstream taper end width $w_{e1}$ that is less than the primary active waveguide width $w_a$ (e.g., the width of the active waveguide 156 in the central region 166 of the active portion 150). For example, at the upstream end 162 of the active portion 150, the active waveguide 156 has a width $w_{e2}$ that is less than the primary active waveguide width $w_a$ (e.g., the width of the active waveguide 156 in the central region 166 of the active portion 150). As the active portion 150 extends from the downstream end 164 to a downstream edge of the central region 166 along the unit axis 105, the width of the active waveguide 156 increases from the downstream taper end width $w_{e1}$ to the primary active waveguide width $w_a$. Along the central region 166 (e.g., between the downstream edge of the central region and the upstream edge of the central region) of the active portion 150, the width of the active waveguide 156 is maintained at the primary active waveguide width $w_a$. As the active waveguide 156 extends from the upstream edge of the central region 166 to the upstream end 162 of the active portion 150, the width of the active waveguide 156 tapers and/or decreases from primary active waveguide width $w_a$ to the downstream taper end width $w_{e2}$. In an example embodiment, the downstream taper end width $w_{e1}$ and the upstream taper end width $w_{e2}$ are approximately equal.

In various embodiments, the upstream taper 152B and the downstream taper 152A acts as optical interfaces between the passive waveguide 116 and the active waveguide 156. For example, the upstream taper 152B may optically couple and/or act as an optical interface between the passive waveguide 116 of the upstream passive portion 110B to the active waveguide 156 of the active portion 150. For example, the downstream taper 152A may optically couple and/or act as an optical interface between the active waveguide 156 of the active portion 150 and the passive waveguide 116 of the downstream passive portion 110A. In various embodiments, the geometry of the upstream and downstream tapers 152A, 152B are optimized to achieve high efficiency transmission between the passive portions 110A, 110B and the active portion 150. For example, the geometry of the upstream and downstream tapers 152A, 152B may be optimized to achieve approximately the highest efficiency transmission between the passive portions 110A, 110B and the active portion. For example, the geometry of the upstream and downstream tapers 152A, 152B may be tailored based on the wavelength or wavelength band of an intended application, a mode or desired mode of light for the intended application, operating conditions (e.g., temperature, pressure, etc.) expected for the intended application, and/or the like. In various embodiments, tailoring the geometry includes setting the downstream taper length $\ell_{e1}$, upstream taper length $\ell_{e2}$, downstream tip width $w_{e1}$, upstream tip width $w_{e2}$, and a taper profile along the length of each taper 152. For example, a taper 152 may have a linear profile, as shown in FIG. 1, an exponential profile, quadratically, cosine-like profile, and/or the like as appropriate for the intended application of the unit 100.

In various embodiments, as can be seen in FIG. 4, the passive waveguide 116 may continue through the active portion 150 of the unit 100. In an example embodiment, the width of the passive waveguide 116 is maintained at width $w_p$ through the active portion 150. In an example embodiment, the width of the passive waveguide 116 may be narrower than width $w_p$ through at least a portion of the active portion 150. For example, the width of the passive waveguide 116 may decrease (e.g., linearly, quadratically, exponentially, cosine-like, and/or the like) between the upstream end 162 of the active portion 150 and the upstream edge of the central region 166, the width of the passive waveguide 116 may be constant through the central region 166 of the active portion (e.g., at a width that is less than width $w_p$), and the width of the passive waveguide 116 may increase (e.g., linearly, quadratically exponentially, cosine-like, and/or the like) between the downstream edge of the active portion 150 and the downstream end 164 of the active portion 150 such that at the downstream end 164 of the active portion 150 the width of the passive waveguide 116 is width $w_p$. In an example embodiment, the width of the passive waveguide 116 may be wider in the central region 166 of the active portion 150 than in the passive portions 110A, 110B.

In various embodiments the width of the passive waveguide $w_p$ and/or the width of the active waveguide $w_a$ is/are configured to enable the unit 100 to be able to transmit and/or modulate high power visible and/or UV photonic beams. For example, the passive waveguide 116 may be patterned and/or formed such that the passive waveguide has a cross-sectional area (e.g., in a cross-section taken substantially perpendicular to a unit axis 105 of the unit 100) that is configured such that when a photonic beam characterized by a wavelength in a range of approximately 350-1000 nm and having an appropriate power for an intended application propagates through the passive waveguide 116, the intensity of the photonic beam in a unit area of the passive waveguide 116 is less than a damage threshold intensity for the material of the passive waveguide 116. Similarly, the central region 166 of the active waveguide 156 may be patterned and/or formed such that the active waveguide 156 has a cross-sectional area (e.g., in a cross-section taken substantially perpendicular to a unit axis 105 of the unit 100) that is configured such that when a photonic beam characterized by a wavelength in a range of approximately 350-1000 nm and having an appropriate power for an intended application propagates through the central region 166 of the active waveguide 156 the intensity of the photonic beam in a unit area of the passive waveguide 156 is less than a damage threshold intensity for the material of the passive waveguide 156. In an example embodiment, the appropriate power for the intended application is in the range of approximately 100-300 mW.

In various embodiments, the upstream taper 152B may be configured to optically mate the passive waveguide 116 of the upstream passive portion 110B to the active waveguide 156 of the active portion 150 with low transition loss. In various embodiments, the downstream taper 152A may be configured to optically mate the active waveguide 156 of the active portion 150 to the passive waveguide 116 of the downstream passive portion 110A with low transition loss. In various embodiments, the passive waveguide 116 is made of a material with low loss. For example, the intensity of a beam propagating through the passive waveguide 116 is approximately constant and/or is only slightly reduced (e.g., by up to a few percent and/or the like) over a length of the passive waveguide 116. In various embodiments, the active waveguide 156 may be made of a material with a higher loss than the passive waveguide 116 material. However, as a beam propagating through the unit 100 only interacts with the active waveguide 156 for a portion of the length of the unit 100, the overall loss in intensity of a beam propagating through the unit 100 is low (e.g., up to a few percent).

The extent of the optical confinement within either the passive or active waveguides 116, 156 can be controlled through choice of material of the passive waveguide 116 and its associated refractive index, width $w_p$ and thickness $t_p$ of the passive waveguide 116, separation s between the passive waveguide 116 and active waveguide 156, choice of the material of the active waveguide 156 and its associated refractive index, primary active waveguide width $w_a$ and thickness $t_a$ of the active waveguide 156, and/or the like.

In various embodiments, the unit 100 and/or a modulator comprising one or more units 100 (e.g., an MZI modulator 200, cascaded MZI modulator 300, ring modulator 400, cascaded ring modulator 500, parallel ring modulator 600, and/or the like) may be configured to change the phase and/or modulate visible and/or ultra-violet (UV) light (e.g., light characterized by wavelengths in the range of approximately 350-1000 nm). For example, because the active portion 150 is a relatively small portion of the unit 100 (e.g., less than half the beam path through the unit 100) and/or due to the use of the downstream and/or upstream tapers 152A, 152B, the unit 100 may cause phase changes and/or modulate a UV beam without incurring damage. For example, the upstream taper 152B may be designed to control how the mode of the input beam 2 is coupled into the active waveguide 156 from the upstream portion 110A (e.g., the passive waveguide 116) and the downstream taper 152A may be designed to control how the mode of the output beam 6 is coupled out of the active waveguide 156 and into the downstream portion 110B (e.g., the passive waveguide 116). For example, the geometry of the active portion 150 (e.g., the geometry of the active waveguide 156) may enable the unit 100 to repeatedly be used to change the phase of a UV beam and/or enable a modulator comprising one or more units 100 to be used to repeatedly modulate a UV beam. In various embodiments, the material used to form the active waveguide 156 may be chosen based on its ability to have high powered UV beams propagate therethrough.

Exemplary Modulators Comprising at Least One Integrated Active/Passive Modulator Unit In various embodiments, one or more units 100 may be incorporated into a modulator. In various embodiments, the modulator is configured to switch between a high intensity/on state and a low intensity/off state at a frequency of at least approximately 100 MHz. In various embodiments, the modulator may provide a combined output beam with extinction ratio between the high intensity/on state to the low intensity/off state of the combined output beam of at least approximately 40 dB. In various embodiments, the modulator may be configured to receive, modulate, and/or provide photon beams in the wavelength range of approximately 350-1000 nm. In various embodiments, the modulator may be a low loss modulator configured to receive, modulate, and/or provide photon beams that (when the modulated beam is in the high intensity/on state) has a power of at least approximately 100 mW.

In various embodiments, the modulator may combine at least one unit 100, an additional passive waveguide, and at least one beam splitter and/or beam combiner. For example, the modulator may be configured to receive a primary input beam (e.g., an visible and/or UV laser beam and/or the like) coupled into at least a portion of the additional passive waveguide; split the primary input beam into at least two parts (e.g., first and second input beams 2 to be provided to two different units 100, an input beam 2 to be provided to a unit 100 and an interaction beam to be interacted with an output beam 6, and/or the like); provide the input beam(s) 2 to the active portion(s) 150 of the units(s) 100 via the upstream passive portion(s) 110B; modify, adjust, change, and/or the like the phase of the input beam(s) 2 based on biasing of the active waveguide(s) 156 by electrical signal(s) 4 to provide output beam(s) 6; and interact two output beams 6 and/or an output beam 6 and an interaction beam to generate a combined beam. The interaction of the two output beams 6 and/or the output beam 6 and the interaction beam will result in either constructive or destructive interference between the interacted beams based on the relative phase difference between the interacted beams. When the interacted beams provide a combined output beam through constructive interference, the combined output beam will be in the high intensity/on state. When the interacted beams provide a combined output beam through destructive interference, the combined output beam will be in the low intensity/off state. The combined output beam may be coupled into at least a portion of the additional passive waveguide and provided (e.g., via the additional passive waveguide) to a downstream optical component, a target, and/or the like.

In various embodiments, the modulator comprising at least one integrated active/passive modulator unit may take a variety of forms. Some example forms discussed in more detail below include MZI modulators and ring modulators. For example, an MZI modulator may comprise one or more pairs of units 100, such as in the example MZI modulator 200 and cascaded MZI modulator 300 illustrated in FIGS. 5 and 6, respectively. In another example, a ring modulator may comprise at least one unit 100 that has been formed into a ring or loop, such as in the example ring modulator 300, cascaded ring modulator 400, and parallel ring modulator 500 illustrated in FIGS. 7, 8, and 9, respectively.

Some Exemplary Mach-Zehnder Interferometer Modulators

FIG. 5 illustrates an example MZI modulator 200. In various embodiments, the MZI modulator 200 comprises a first unit 100A and a second unit 100B. In various embodiments, the MZI modulator 200 comprises a first unit 100A and a second unit 100B that are in parallel within one another. Each of the first and second units 100A and 110B comprise an active portion 150 (e.g., 150A, 150B) sandwiched between a passive upstream portion 110B and a passive downstream portion 110A.

The first unit 100A comprises a first active portion 150A that is configured to receive and react to a first electrical signal 4A. For example, the refractive index of the active waveguide 156 of the active portion 150A of the first unit 100A may change in response to changes in the first electrical signal 4A applied to the electrical contacts 154 of the first unit 100A. The second unit 100B comprises a second active portion 150B that is configured to receive and react to a second electrical signal 4B. For example, the refractive index of the active waveguide 156 of the active portion 150B of the second unit 100B may change in response to changes in the second electrical signal 4B applied to the electrical contacts 154 of the second unit 100B.

In various embodiments, the MZI modulator 200 comprises an upstream passive waveguide 210B that is coupled to the passive upstream portions 110B of both the first and second units 100A, 100B. For example, the upstream passive waveguide 210B may be a passive waveguide that is coupled to the passive upstream portion 110B of each of the first unit 100A and the second unit 100B. In an example embodiment, the upstream passive waveguide 210B is coupled to the passive upstream portions 110B of the first and second units 100A, 100B via a beam splitter 202. The first and second units 100A, 100B may be integrated passive/active modulator units 100 comprising a passive upstream portion 110B, an active portion 150, and a passive downstream portion 110A. The MZI modulator 200 may further comprise a downstream passive waveguide 210A. The downstream passive waveguide 210A may be coupled to the downstream passive portion 110A of each of the first and second units 100A, 100B. For example, the downstream passive waveguide 210A may be coupled to the downstream passive portion 110A of the first and second units 100A, 100B via a beam combiner 204.

For example, a primary input beam 3 may be provided to the upstream passive waveguide 210B. A beam splitter 202 may be used to split the primary input beam 3 traveling through the upstream passive waveguide 210B into a first input photon beam 2A and a second input photon beam 2B. In an example embodiment, the first input photon beam 2A has approximately half the intensity of the primary photon beam 3 (e.g., 40-60% of the intensity of primary photon beam 3). The first input photon beam 2A may be provided to and/or propagate through the passive upstream portion 110B of the first unit 100A and thereby be provided to and/or propagate through the active portion 150A of the first unit 100A. The phase of the first input photon beam 2A may be modified, changed, adjusted, and/or the like as the first input photon beam 2A propagates through the active portion 150A based on a first electrical signal 4A provided to the electrical contacts 154 of the active portion 150A of the first unit such that a first output beam 6A is provided to and/or propagates through the passive downstream portion 110A of the first unit 100A. Similarly, the second input photon beam 2B may be provided to and/or propagate through the passive upstream portion 110B of the second unit 100B and thereby be provided to and/or propagate through the active portion 150B of the second unit 100B. The phase of the second input photon beam 2B may be modified, changed, adjusted, and/or the like as the second input photon beam 2B propagates through the active portion 150B based on a second electrical signal 4B provided to the electrical contacts 154 of the active portion 150B of the second unit 100B such that a second output beam 6B is provided to and/or propagates through the passive downstream portion 110A of the second unit 100B. The passive downstream portions 110A of both the first unit 100A and the second unit 100B may be coupled to a beam combiner 204 that receives the first and second output beams 6A, 6B, couples and/or combines the first and second output beams 6A, 6B to form a combined output beam 7, and provides the combined output beam 7 to a downstream passive waveguide 210A.

Based on the phase difference between the first and second output beams 6A and 6B, combining the first and second output beams (e.g., via the beam combiner 204) may result constructive interference or destructive interference. If the first and second output beams 6A, 6B are aligned in phase (e.g., the relative phase difference of the two beams is approximately zero and/or both beams experienced approximately the same change in phase when propagating through the active portions 150A, 150B of the respective first and second units 100A, 100B), the first and second output beams 6A, 6B will experience constructive interference and the combined output beam 7 will have approximately the same intensity as the primary input beam 3 (minus any loss). If the first and second output beams 6A, 6B are out of phase, the first and second output beams 6A, 6B will experience destructive interference and the combined output beam 7 will have a significantly lower intensity compared to the primary input beam 3 (even after taken into account any loss). For example, if the active region 150A of the first unit 100A causes the first input photon beam 2A to experience relative phase change that is not approximately and integer multiple of $\pi$ with respect to the phase shift experienced by the second input photon beam 2B when propagating through the active region 150B of the second unit 100B, the first and second output beams 6A, 6B will be out of phase and will destructively interfere to provide a combined output beam 7 having a reduced intensity. If the relative phase shifts of first and second output beams are $\pi/2$ or $3\pi/2$, the combined output beam 7 will have an intensity of approximately zero.

In various embodiments, the first and second electrical signals 4A, 4B may be controlled (e.g., via a computing entity, controller, and/or the like) to cause the combined output beam 7 to be modulated between a high intensity state and a low intensity state. For example, the ratio of the intensity of the combined output beam 7 to a corresponding input photonic beam 3 for the high intensity state may be large (e.g., approximately 1, greater than 0.95, greater than 0.9, greater than 0.8, greater than 0.7, greater than 0.6, and/or the like). The ratio of the intensity of the combined output beam 7 to a corresponding input photonic beam 3 for the low intensity state may be small (e.g., less than 0.5, less than 0.4, less than 0.3, less than 0.2, less than 0.1, less than 0.05, approximately 0, and/or the like). For example, the high intensity state may be an "on" state and the low intensity state may be an "off" state. For example, the extinction ratio between the high intensity/on state to the low intensity/off state of the combined output beam 7 may be approximately 40 dB or greater. The material of the active waveguides 156 of the first and second units 100A, 100B may react quickly to changes in the first and second electrical signals 4A, 4B applied thereto, respectively. Thus, the MZI modulator 200 may be switched between a high intensity/on state and a low intensity/off state quickly (e.g., at a frequency of approximately 100 MHz or faster).

In various embodiments, the beam splitter 202 and/or the beam combiner 204 are low loss optical components. In various embodiments, the beam splitter 202 and/or the beam combiner 204 may be active or passive optical components, as appropriate for the application. In an example embodiment, the beam splitter 202 may be the upstream passive waveguide 210B splitting into the two upstream passive portions 110B of the first and second units 100A, 100B. In an example embodiment, the beam combiner 204 may be the two downstream passive portions 110A combining into one downstream passive waveguide 210A.

In various embodiments, the first and second units 100A, 100B have upstream passive portions 110B that are the same length, active portions 150 that are the same length, and downstream passive portions 110A that are the same length and/or have lengths that differ by a particular length, wherein the particular length is the product of a wavelength $\lambda$ that characterizes the input photonic beam 3 and an integer (e.g., $n\lambda$, where n is an integer). For example, in an example embodiment, any phase difference between the first and second output beams 6A, 6B is due to phase changes, alterations, modifications, and/or the like experienced by the first and/or second input photonic beam portions 2A, 2B when propagating through the respective action region 150A, 150B. In an example embodiment, one or both of the downstream or upstream passive portions 110A, 110B of the first and second units 100A, 100B may be different lengths. For example, the downstream passive portion 110A of the first unit 100A may be half a wavelength (e.g., $\lambda/2$) longer than the downstream passive portion 110A of the second unit 100B. For example, the relative lengths of the downstream and/or upstream passive portions 110A, 110B and/or the active portions 150A, 150B may be set so as to introduce a relative phase shift between a first photonic beam passing through the first unit 100A and a second photonic beam passing through the second unit 100B.

FIG. 6 illustrates an example embodiment of a cascaded MZI modulator 300. In various embodiments, the cascaded MZI modulator 300 comprises at least two MZI modulators 200 (e.g., 200A, 200B) that are serially coupled via an intermediate passive waveguide 210C. For example, the cascaded MZI modulator 300 comprises a first MZI modulator 200A and a second MZI modulator 200B. The first MZI modulator 200A comprises first and second units 100A, 100B with the upstream passive portions 110B of the first and second units 100A, 100B both coupled to an upstream passive waveguide 210A (e.g., via a beam splitter 202 and/or the like) and the downstream passive portions 110A of the first and second units 100A, 100B both coupled to the intermediate passive waveguide 210C (e.g., via a beam combiner 204 and/or the like). The second MZI modulator 200B comprises third and fourth units 100C, 100D with the upstream passive portions 110B of the third and fourth units 100C, 100D both coupled to the intermediate passive waveguide 210C (e.g., via a beam splitter 202 and/or the like). The downstream passive portions 110A of both the third and fourth units 100C, 100D are both coupled to either another intermediate passive waveguide 210C (e.g., if the cascaded MZI modulator comprises three or more MZI modulators 200) or to a downstream passive waveguide 210A (e.g., if the second MZI modulator 200B is the last MZI modulator 200 of the cascaded MZI modulator 300).

In various embodiments, a cascaded MZI modulator 300 may be used to further decrease the ratio of the intensity of the combined output beam 7 compared to the intensity of the primary input beam 3 in the low intensity/off state. For example, the first MZI modulator 200A may be operated (e.g., via the first and second electrical signals 4A, 4B applied to the active portions 150A, 150B of the first and second units 100A, 100B, respectively) in a low intensity/off state to provide an intermediate beam 5 to the intermediate passive waveguide 210C that has a low intensity compared to the primary input beam 3 (e.g., the ratio of the intensity of the intermediate beam to the intensity of the input photonic beam may be less than 0.5, less than 0.4, less than 0.3, less than 0.2, less than 0.1, less than 0.05, approximately 0, and/or the like). The intermediate passive waveguide 210C may then provide the intermediate beam 5 to the second MZI modulator 200B. The second MZI modulator 200B may then be operated (e.g., via the third and fourth electrical signals 4C, 4D applied to the active portions 150C, 150D of the third and fourth units 100C, 100D, respectively) in a low intensity/off state to provide a combined output beam 7 to the downstream passive waveguide 210A that has a low intensity compared to the intermediate beam 5 (e.g., the ratio of the intensity of the combined output beam to the intensity of the intermediate beam may be less than 0.5, less than 0.4, less than 0.3, less than 0.2, less than 0.1, less than 0.05, approximately 0, and/or the like). Thus, the ratio of the intensity of the combined output beam 7 to the primary input beam 3 may be less than 0.25, less than 0.16, less than 0.09, less than 0.04, less than 0.01, less than 0.025, approximately 0, and/or the like.

In various embodiments, a cascaded MZI modulator 300 may be used to further decrease the ratio of the intensity of the combined output beam 7 compared to the intensity of the primary input beam 3 in the low intensity/off state while having a minimal effect on the ratio of the intensity of the combined output beam 7 compared to the intensity of the primary input beam 3 in the high intensity/on state (e.g., due to the low loss nature of the units 100). For example, the extinction ratio between the high intensity/on state to the low intensity/off state of the combined output beam 7 may be approximately 40 dB or greater. In various embodiments, the cascaded MZI modulator 300 may be switched between a high intensity/on state and a low intensity/off state quickly (e.g., at a frequency of approximately 100 MHz or faster).

Some Exemplary Ring Modulators

FIG. 7 illustrates an example embodiment of ring modulator 400, in accordance with an example embodiment. In various embodiments, the ring modulator 400 comprises a unit ring or loop 405. In various embodiments, a unit ring or loop 405 is a unit 100 that is formed in a ring or loop. In various embodiments, the ring modulator 400 further comprises a passive waveguide 410. In various embodiments, the passive waveguide 410 is a through passive waveguide that may be used to couple the modulator to other waveguide portions, other optical components, and/or the like. For example, the unit ring or loop 405 may comprise a unit 100 formed in a ring or loop such that the upstream passive waveguide 110A and the downstream passive waveguide 110B are both in photonic communication with and/or optically coupled to the passive waveguide 410. In an example embodiment, the unit ring or loop 405 is optically coupled to the passive waveguide via a beam splitter/combiner 402.

In an example embodiment, a primary input beam 3 propagates through the passive waveguide 410. The primary input beam 3 propagating through the passive waveguide 410 interacts with a beam splitter/combiner 402. The beam splitter/combiner 402 causes the primary input beam 3 to be split into an input photon beam 2 and an interaction beam. The input photon beam 2 is provided to the unit ring or loop 405 (e.g., via the beam splitter/combiner 402). For example, the input photon beam 2 may be provided to an upstream passive portion 110B of the unit 100. The beam splitter/combiner 402 may cause the second input photon beam to interfere with an output beam 6 that has passed through the active portion 150 of the unit 100. For example, the input photon beam 2 may be provided to the active portion 150 (e.g., via the upstream taper 152B) wherein the evolution of the phase of the input photon beam 2 may be modified, adjusted, and/or changed such that an output beam 6 is provided to the downstream passive portion 110A (e.g., via the downstream taper 152B). The phase of the output beam 6 may be different from an expected phase, where the expected phase is the phase the input photon beam 2 would have if the first input photon beam had continued to propagate through the active region 150 without experiencing any or substantially any phase evolution adjustment, modification, and/or change. The output beam 6 may be provided to the beam splitter/combiner 402 via the downstream passive portion 110A of the unit 100. The beam splitter/combiner 402 combines and/or interferes the output beam 6 and the interaction beam. The result of combining and/or interfering the interaction beam with the output beam 6 is a combined output beam 7 that propagates through the passive waveguide 410 downstream from the beam splitter/combiner 402. In an example embodiment, the input photon beam 2 of the input has an intensity that is approximately half the intensity (e.g., 60-40% of the intensity) of the primary input beam 3.

In various embodiments, the active portion 150 of the unit 100 may modify, adjust, change, and/or the like the phase of the input photon beam 2 such that the output beam 6 has a phase that constructively or destructively interferes with the second input photon beam. For example, an electrical signal 4 may be provided to the active portion 150 such that the phase of the input photon beam 2 is modified, adjusted, and/or changed to provide an output beam 6 that has approximately the same phase as the second input photon beam to provide a combined output beam 7 in a high intensity/on state. For example, an electrical signal 4 may be provided to the active portion 150 such that the phase of the input photon beam 2 is modified, adjusted, and/or changed to provide an output beam 6 that is out of phase with respect to the second input photon beam to provide a combined output beam 7 in a low intensity/off state.

In various embodiments, the electrical signal 4 may be controlled (e.g., via a computing entity, controller, and/or the like) to cause the combined output beam 7 to be modulated between a high intensity/on state and a low intensity/off state. For example, the ratio of the intensity of the combined output beam 7 to the intensity of a corresponding primary input beam 3 for the high intensity/on state may be large (e.g., approximately 1, greater than 0.95, greater than 0.9, greater than 0.8, greater than 0.7, greater than 0.6, and/or the like). The ratio of the intensity of the combined output beam 7 to the intensity of a corresponding input photonic beam 3 for the low intensity/off state may be small (e.g., less than 0.5, less than 0.4, less than 0.3, less than 0.2, less than 0.1, less than 0.05, approximately 0, and/or the like). For example, the extinction ratio between the high intensity/on state to the low intensity/off state of the combined output beam 7 may be approximately 40 dB or greater. The material of the active waveguide 156 of the unit 100 may react quickly to changes in the electrical signal 4 applied thereto. Thus, the ring modulator 400 may be switched between a high intensity/on state and a low intensity/off state quickly. In various embodiments, the ring modulator 400 may be switched between a high intensity/on state and a low intensity/off state quickly (e.g., at a frequency of approximately 100 MHz or faster).

In various embodiments, the beam splitter/combiner 402 is a low loss optical component. In various embodiments, the beam splitter/combiner 402 is a two optical component element and at least one of the optical components (e.g., a beam splitter or a beam combiner) is a low loss optical component. In various embodiments, the beam splitter/combiner 402 may be and/or comprise active or passive optical components, as appropriate for the application.

FIG. 8 illustrates an example embodiment of a cascaded ring modulator 500. In various embodiments, a cascaded ring modulator 500 comprises a passive waveguide 410, a unit ring or loop 405, and a passive waveguide ring or loop 505. In various embodiments, the passive waveguide 410 is a through passive waveguide that may be used to couple the modulator to other waveguide portions, other optical components, and/or the like. In various embodiments, the passive waveguide ring or loop 505 may be configured to couple light into and out of the through passive waveguide 410. In various embodiments, the cascaded ring modulator 500 comprises a first and second beam splitter/combiner 502, 504. For example, a primary input beam 3 may be propagating through the passive waveguide 410 and interact with the first beam splitter/combiner 502. The first beam splitter/combiner 502 may split the primary input beam 3 into a first input beam 2' and a first interaction beam. The first beam splitter/combiner 502 may couple the first input beam 2' into the passive waveguide ring or loop 505. The first input beam 2' may propagate through the passive waveguide ring or loop 505 and interact with a second beam splitter/combiner 504. The second beam splitter/combiner 504 may split the first input beam 2' into a second input beam 2 that is coupled into the unit ring or loop 405 and a second interaction beam that is interacted with an output beam 6 of the unit ring or loop 405. The second input beam 2 propagates through the upstream passive portion 110B and interacts with the active portion 150 of the unit 100. The active portion 150 may adjust, modify, change, and/or the like the phase of the second input beam 2 to generate the output beam 6. The output beam 6 propagates through the downstream passive portion 110A of the unit 100. The output beam 6 interacts with the second beam splitter/combiner 504 to cause the output beam 6 to interfere with the second interaction beam, resulting in an intermediate combined beam 6' that propagates through the passive waveguide ring or loop 505. The intermediate combined beam 6' may propagate through the waveguide ring or loop 505 to interact with the first beam splitter/combiner 502. The first beam splitter/combiner 502 causes the first interaction beam and the intermediate combined beam 6' to interact to provide a combined output beam 7 propagating downstream through the passive waveguide 410.

In various embodiment, an electrical signal 4 may be provided to the active portion 150 (e.g., to the active waveguide 156 via contacts 154) to cause the output beam 7 to be in a high intensity/on state or a low intensity/off state as a result of constructive and/or destructive interference between the intermediate combined beam 6' and the first interaction beam. For example, the electrical signal 4 may be configured to cause, for a first period of time, the phase of the second input beam 2 to be changed, modified, and/or adjusted such that the resulting intermediate combined beam 6' destructively interferes with the first interaction beam, to provide a combined output beam 7 in a low intensity/off state. For example, the electrical signal 4 may be configured to cause, for a second period of time, the phase of the second input beam 2 to be changed, modified, and/or adjusted such that the resulting intermediate combined beam 6' constructively interferes with the first interaction beam, to provide a combined output beam 7 in a high intensity/on state.

In various embodiments, the first and second beam splitter/combiners 502, 504 are low loss optical components. In various embodiments, the first and/or second beam splitter/combiners 502, 504 is a two optical component element and at least one of the optical components (e.g., a beam splitter or a beam combiner) is a low loss optical component. In various embodiments, the first and/or second beam splitter/combiners 502, 504 may be and/or comprise active or passive optical components, as appropriate for the application.

The material of the active waveguide 156 of the unit 100 may react quickly to changes in the electrical signal 4 applied thereto. Thus, the cascaded ring modulator 500 may be switched between a high intensity/on state and a low intensity/off state quickly. In various embodiments, the cascaded ring modulator 500 may be switched between a high intensity/on state and a low intensity/off state quickly (e.g., at a frequency of approximately 100 MHz or faster). In various embodiments, the extinction ratio between the high intensity/on state to the low intensity/off state of the combined output beam 7 may be approximately 40 dB or greater.

FIG. 9 illustrates an example embodiment of a parallel ring modulator 600. In various embodiments, a parallel ring modulator 600 comprises a passive waveguide 410, a first unit ring or loop 405A, and a second unit ring or loop 405B. The first unit ring or loop 405A comprises a first unit 100A and the second unit ring or loop 405B comprises a second unit 100B. In various embodiments, the parallel ring modulator 600 comprises a first beam splitter/combiner 602 configured to couple the first unit ring or loop 405A to the passive waveguide 410. In various embodiments, the passive waveguide 410 is a through passive waveguide that may be used to couple the modulator to other waveguide portions, other optical components, and/or the like. In an example embodiment, the parallel ring modulator 600 comprises a second beam splitter/combiner 604 configured to couple the second unit ring or loop 405B to the passive waveguide 410.

For example, a primary input beam 3 may be coupled into the passive waveguide 410, propagate along the passive waveguide 410, and interact with the first beam splitter/combiner 602. The first beam splitter/combiner 602 may split the primary input beam 3 into a first input beam 2A and a first interaction beam. In an example embodiment, the intensity of the first input beam 2A is approximately half (e.g., 60-40%) of the intensity of the primary input beam 3. The first input beam 2A may be provided to the first unit ring or loop 405A such that the first input beam 2A propagates through the upstream passive portion 110B and interacts with the active portion 150A of the first unit 100A. The active portion 150A of the first unit 100A may modify, adjust, change, and/or the like phase of the first input beam 2A to provide a first output beam 6A. In various embodiments, the modification, adjustment, change, and/or the like to the phase of the first input beam 2A by the active portion 150A (e.g., the amount of change and the time evolution the phase change) is controlled via a first electrical signal 4A applied to the active waveguide 156 of the active portion 150A. The first output beam 6A propagates through the downstream passive portion 110A of the first unit 100A and interacts with the first beam splitter/combiner 602. The first beam splitter/combiner 602 combines the first output beam 6A and the first interaction beam. The first output beam 6A and the first interaction beam may constructively or destructively interfere based on the relative phases thereof to generate an intermediate beam 5. The intermediate beam 5 continues to propagate along the passive waveguide 410.

In various embodiments, as the intermediate beam 5 propagates along the passive waveguide 410, the intermediate beam 5 interacts with a second beam splitter/combiner 604. The second beam splitter/combiner 604 may split the intermediate beam 5 into a second input portion 2B and a second interaction beam. In an example embodiment, the intensity of the first input beam 2B is approximately half (e.g., 60-40%) of the intensity of the intermediate beam 5. The second input beam 2B may be provided to the second unit ring or loop 405B such that the second input beam 2B propagates through the upstream passive portion 110B and interacts with the active portion 150B of the second unit 100B. The active portion 150B of the second unit 100B may modify, adjust, change, and/or the like phase of the second input beam 2B to provide a second output beam 6B. In various embodiments, the modification, adjustment, change, and/or the like to the phase of the second input beam 2B by the active portion 150B (e.g., the amount of change and the time evolution the phase change) is controlled via a second electrical signal 4B applied to the active waveguide 156 of the active portion 150B. The second output beam 6B propagates through the downstream passive portion 110A of the second unit 100B and interacts with the second beam splitter/combiner 604. The second beam splitter/combiner 604 combines the second output beam 6B and the second interaction beam. The second output beam 6B and the second interaction beam may constructively or destructively interfere based on the relative phases thereof to generate a combined output beam 7. The combined output beam 7 continues to propagate downstream along the passive waveguide 410.

In various embodiments, the combined output beam 7 may be in a high intensity/on state or a low intensity/off state and may switch between these two states. The state of the combined output beam 7 and the switching between the states of the combined output beam 7 controlled via application of the first and second electrical signals 4A and 4B to the first and second units 100A, 100B, respectively. For example, the first unit ring or loop 405A may be operated (e.g., via the first electrical signal 4 applied to the active portion 150A of the first unit 100A) in a low intensity/off state to provide an intermediate beam 5 to the that has a low intensity compared to the primary input beam 3 (e.g., the ratio of the intensity of the intermediate beam to the intensity of the primary input beam may be less than 0.5, less than 0.4, less than 0.3, less than 0.2, less than 0.1, less than 0.05, approximately 0, and/or the like). The second unit ring or loop 405B may then be operated (e.g., via the second electrical signal 4B applied to the active portion 150B of the second unit 100B) in a low intensity/off state to provide a combined output beam 7 downstream to the passive waveguide 410 that has a low intensity compared to the intermediate beam 5 (e.g., the ratio of the intensity of the combined output beam to the intensity of the intermediate beam may be less than 0.5, less than 0.4, less than 0.3, less than 0.2, less than 0.1, less than 0.05, approximately 0, and/or the like). Thus, the ratio of the intensity of the combined output beam 7 to the primary input beam 3 may be less than 0.25, less than 0.16, less than 0.09, less than 0.04, less than 0.01, less than 0.025, approximately 0, and/or the like. In various embodiments, a parallel ring modulator 600 may be used to further decrease the ratio of the intensity of the combined output beam 7 compared to the intensity of the primary input beam 3 in the low intensity/off state while having a minimal effect on the ratio of the intensity of the combined output beam 7 compared to the intensity of the primary input beam 3 in the high intensity/on state (e.g., due to the low loss of the modulator). In various embodiments, the extinction ratio between the high intensity/on state to the low intensity/off state of the combined output beam 7 may be approximately 40 dB or greater. In various embodiments, the parallel ring modulator 600 may be switched between a high intensity/on state and a low intensity/off state quickly (e.g., at a frequency of approximately 100 MHz or faster).

Exemplary Method of Fabricating an Integrated Active/Passive Modulator Unit

FIG. 10 provides a flowchart illustrating processes, procedures, operations, and/or the like performed to fabricate a unit 100. FIGS. 11A-11E provides cross-sectional views of an active portion 150 of a unit 100 at various points during the fabrication process. Starting at step/operation 702 of FIG. 10, a first cladding layer 114 is deposited on the substrate 112. For example, a first cladding layer 114 comprising oxide and/or dielectric (e.g., SiO$_2$) may be deposited on the substrate 112. In various embodiments, the first cladding layer 114 may electrically and/or thermally isolate the passive waveguide 116 from the substrate 112.

Figure 11A:
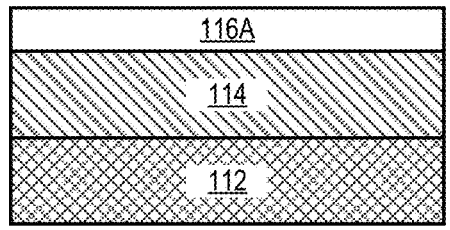

At step/operation 704, a waveguide layer 116A is deposited onto the first cladding layer 114. For example, a waveguide layer 116A comprising the material (e.g., Al$_2$O$_3$, Si$_3$N$_4$, HfO$_2$, AlN, Ta$_2$O$_5$, and/or the like) of the passive waveguide 116 may be deposited onto the first cladding layer 114. FIG. 11A illustrates a cross-section of an active portion 150 of a unit 100 after completion of step/operation 704. For example, the first cladding layer 114 is deposited on the substrate 112 and a layer of the passive waveguide 116 material is deposited on the first cladding layer 114 to form a waveguide layer 116A.

Figure 11B:
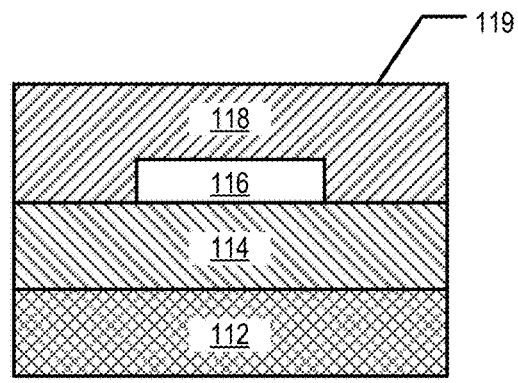

Continuing with FIG. 10, at step/operation 706, the waveguide layer 116A is etched and/or patterned to form the passive waveguide 116. For example, the waveguide layer 116A may be etched and/or patterned to form the passive waveguide 116 into the designed waveguide geometry. In various embodiments, a photolithography and/or mask etching process may be used to etch the passive waveguide 116 from the waveguide layer 116A. At step/operator 708, a second cladding layer 118 is deposited. For example, the second cladding layer 118 is deposited onto the passive waveguide 116 and the first cladding layer 114. For example, the second cladding layer 118 comprising oxide and/or dielectric (e.g., SiO$_2$) may be deposited on the first cladding layer 114 and the passive waveguide 116. The exposed surface 119 of the second cladding layer 118 may be polished (e.g., using chemical mechanical polishing (CMP)) so that the exposed surface 119 of the second cladding layer 118 is smooth and/or flat. FIG. 11B shows a cross-section of the active portion 150 of a unit 100 after the second cladding layer 118 is deposited and polished (e.g., via CMP).

Figure 11C:
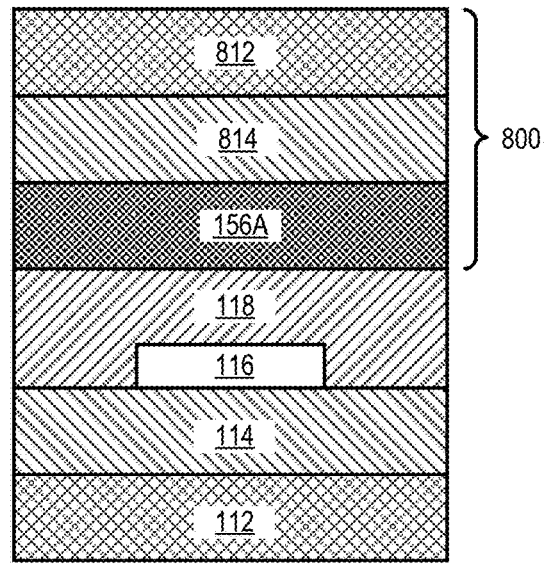

Returning to FIG. 10, at step/operation 710, an active material blank 800 is bonded onto the exposed layer 119 of the second cladding layer 118. In various embodiments, as shown in FIG. 11C, the active material blank 800 comprises an active layer 156A, and oxide layer 814, and a blank substrate 812. The active layer 156A may be made of the material (e.g., LiNbO$_3$, LiTaO$_3$, BaTiO$_3$, and/or the like) that is used to form the active waveguide 156. Continuing with FIG. 10, at step/operation 712, the blank substrate 812 and the oxide layer 814 are removed. For example, etching may be used to remove the blank substrate 812 and the oxide layer 814.

Figure 11D:
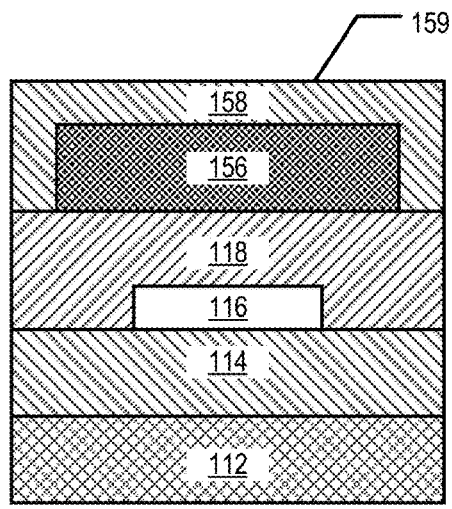

At step/operation 714, the active layer 156A is etched for form the active waveguide 156. For example, the active layer 156A may be etched to form the downstream and upstream tapers 152A, 152B, the designed active waveguide geometry, and/or the like. For example, the active waveguide 156 may be formed by etching the active layer 156A. In various embodiments, a photolithography and/or mask etching process may be used to etch the active waveguide 156 from the active layer 156A. At step 716, a third cladding layer 158 is deposited onto the active waveguide 156 and/or the second cladding layer 118. For example, the third cladding layer 158 is deposited onto the active waveguide 156 and the second cladding layer 118. For example, the third cladding layer 158 comprising oxide and/or dielectric (e.g., SiO$_2$) may be deposited on the second cladding layer 118 and the active waveguide 156. At step/operation 718, the exposed surface 159 of the third cladding layer 158 is polished. For example, the exposed surface 159 of the third cladding layer 158 may be polished using CMP such that the exposed surface is smooth and/or flat. FIG. 11D illustrates a cross-section of the active portion of a unit 100 after the polishing of the exposed surface 159 of the third cladding layer 158.

Figure 11E:
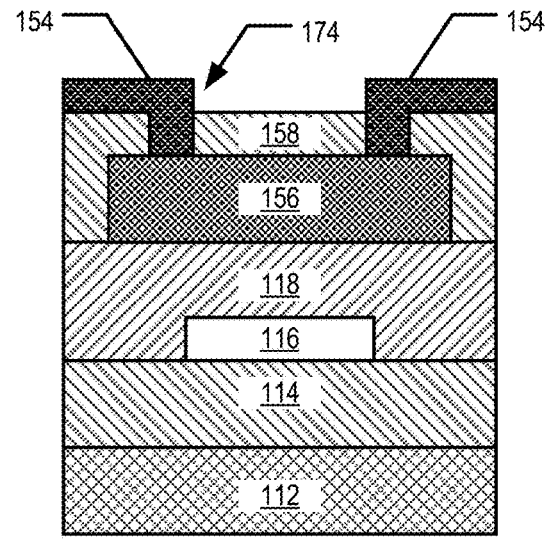

Continuing with FIG. 10, at step/operation 720, via openings 174 (See FIG. 11E) are etched into the third cladding layer 158. For example, the via openings 174 may be an opening etched into the third cladding layer 158 such that vias may be deposited into the via openings 174 such that the vias are in electrical communication with the active waveguide 156. In various embodiments, a photolithography and/or mask etching process may be used to etch the via openings 174 through the third cladding layer 158. At step/operation 722, vias are deposited into the via openings 174 and onto the exposed surface 159 of the third cladding layer 158. For example, a via material (e.g., a conductive material) may be deposited into the via openings and on the exposed surface 159 of the third cladding layer 158. At step/operation 724, the vias are patterned to form the electrical contacts 154. For example, excess via material may be etched away, polishing may be performed, and/or the like to form the electrical contacts 154 from the deposited via material. In various embodiments, a photolithography and/or mask etching process may be used to etch the electrical contacts 154 from the deposited via material. FIG. 11E provides a cross-section of the active portion 150 of a unit 100 after the electrical contacts 154 have been patterned.

In various embodiments, the unit 100 is a stand-alone device. In various embodiments, one or more units 100 may be coupled to one another, additional passive waveguides (e.g., through passive waveguides, ring or loop passive waveguides, intermediate passive waveguides, and/or the like) to provide a modulator. In various embodiments, the one or more units 100 may be coupled to one another and/or to additional passive waveguides via one or more beam splitters and/or beam combiners. For example, the modulator may be an MZI modulator 200, cascaded MZI modulator 300, ring modulator 400, cascaded ring modulator 500, parallel ring modulator 600, and/or the like. In various embodiments, the modulator may be a stand-alone device and/or element that may be incorporated into a photonic circuit, for example. In various embodiments, the modulator is incorporated into and/or coupled to an ion trap of a trapped ion quantum computer. For example, the modulator may be coupled to the ion trap so as to provide a modulated laser beam, and/or other modulated optical source, to one or more ions trapped within the ion trap.

Exemplary Quantum Computer Comprising a Modulator Comprising an Integrated Active/Passive Modulator FIG. 12 provides a schematic diagram of an example quantum computer system 900 comprising an ion trap 50 having at least one modulator (e.g., MZI modulator 200, cascaded MZI modulator 300, ring modulator 400, cascaded ring modulator 500, parallel ring modulator 600) comprising one or more units 100, in accordance with an example embodiment. In various embodiments, the quantum computer system 900 comprises a computing entity 10 and a quantum computer 910. In various embodiments, the quantum computer 910 comprises a controller 30, a cryogenic and/or vacuum chamber 40 enclosing an ion trap 50, and one or more manipulation sources 64 (e.g., 64A, 64B, 64C). In an example embodiment, the one or more manipulation sources 64 may comprise one or more lasers (e.g., UV lasers, visible lasers, microwave lasers, and/or the like). In various embodiments, the one or more manipulation sources 64 are configured to manipulate and/or cause a controlled quantum state evolution of one or more ions within the ion trap 50. For example, in an example embodiment, wherein the one or more manipulation sources 64 comprise one or more lasers, the lasers may provide one or more laser beams to the ion trap 50 within the cryogenic and/or vacuum chamber 40. The one or more manipulation sources 64 each provide a laser beam and/or the like to the ion trap 50 via a corresponding beam path 66 (e.g., 66A, 66B, 66C). In various embodiments, at least one beam path 66 comprises a modulator (e.g., MZI modulator 200, cascaded MZI modulator 300, ring modulator 400, cascaded ring modulator 500, parallel ring modulator 600) comprising one or more units 100. The modulator may be controlled by the controller 30 via one or more electrical signals 4 provided to the active portion(s) 150 of the one or more units 100. For example, the controller 30 may cause one or more electrical signal sources, drivers and/or the like to provide the electrical signal(s) 4. Via the modulator (e.g., comprising the one or more units 100) a manipulation source 64 may provide a modulated beam, via a beam path 66, to the ion trap 50.

In various embodiments, a computing entity 10 is configured to allow a user to provide input to the quantum computer 910 (e.g., via a user interface of the computing entity 10) and receive, view, and/or the like output from the quantum computer 910. The computing entity 10 may be in communication with the controller 30 of the quantum computer 910 via one or more wired or wireless networks 20 and/or via direct wired and/or wireless communications. In an example embodiment, the computing entity 10 may translate, configure, format, and/or the like information/data, quantum computing algorithms, and/or the like into a computing language, executable instructions, command sets, and/or the like that the controller 30 can understand and/or implement.

In various embodiments, the controller 30 is configured to control the electrical signal sources and/or drivers, cryogenic system and/or vacuum system controlling the temperature and pressure within the cryogenic and/or vacuum chamber 40, manipulation sources 60, and/or other systems controlling the environmental conditions (e.g., temperature, humidity, pressure, and/or the like) within the cryogenic and/or vacuum chamber 40 and/or configured to manipulate and/or cause a controlled evolution of quantum states of one or more ions within the ion trap 50. In various embodiments, the ions trapped within the ion trap 50 are used as qubits of the quantum computer 910.

Exemplary Method of Fabricating an Integrated Modulator

In various embodiments, a modulator (e.g., MZI modulator 200, cascaded MZI modulator 300, ring modulator 400, cascaded ring modulator 500, parallel ring modulator 600) comprising one or more units 100 is integrated into a beam path 66. For example, the modulator may be integrated into an ion trap 50 so as to provide a beam path 66 that provides a modulated beam to the ion trap 50. For example, a manipulation source 64 may generated a continuous laser beam and/or a pulsed laser beam. The laser beam may be provided to the ion trap 50 via the beam path 66. As the beam path 66 comprises a modulator, the beam is modulated by the modulator so that the beam provided to the ion trap 50 is modulated.

In various embodiments, fabricating an integrated modulator includes steps/operations 702-722 of FIG. 10. Instead of proceeding from step/operation 722 to step/operation 724, the process may continue to step/operation 734 of FIG. 13. At step/operation 734, vias are etched. For example, at step/operation 722, vias 155 are deposited into the via openings 174 etched through the third cladding layer 158. For example, FIG. 14A illustrates a cross-section of an active portion 150 of a unit 100 after vias 155 have been deposited into the via openings 174 and etched.

Continuing with FIG. 13, at step/operation 736, additional cladding 168 is deposited onto the vias 155 and third cladding layer 158. For example, additional cladding 168 comprising oxide and/or dielectric (e.g., $SiO_2$) may be deposited on the third cladding layer 158 and the vias 155. At step operation 738, the exposed surface 169 of the additional cladding 168 is polished. For example, the exposed surface 169 of the additional cladding 168 is polished (e.g., using CMP) to smooth and/or flatten the exposed surface 169 of the additional cladding 168. At step/operation 740, the via openings 174A are etched. For example, via openings 174A may be etched (e.g., via using a mask and/or the like). For example, the via openings 174A are etched through the additional cladding to the vias 155. In various embodiments, a photolithography and/or mask etching process may be used to etch the via openings 174A through the additional cladding 168. FIG. 14B illustrates a cross-section of an active portion 150 of a unit 100 after the etching of the via openings 174A.

Continuing FIG. 13, at step operation 742 vias are deposited into the via openings 174 and onto the exposed surface 169 of the additional cladding 168. For example, a via material (e.g., a conductive material) may be deposited into the via openings 174A and on the exposed surface 169 of the additional cladding 168. In various embodiments, the vias are deposited into electrical communication with the vias 155. At step/operation 744, the vias are patterned to form the electrical contacts 154. For example, excess via material may be etched away (e.g., using a mask and/or the like), polishing may be performed, and/or the like to form the electrical contacts 154 from the deposited via material. In various embodiments, a photolithography and/or mask etching process may be used to etch the electrical contacts 154 from the deposited via material. FIG. 14C provides a cross-section of the active portion 150 of a unit 100 after the electrical contacts 154 have been patterned.

In various embodiments, the modulator (e.g., MZI modulators 200, cascaded MZI modulators 300, ring modulators 400, cascaded ring modulators 500, parallel ring modulators 600, and/or the like) comprises a beam splitter 202, beam combiner 204, beam splitter/combiner 402, 502, 504, 602, 604, and/or the like. In various embodiments, the beam splitters, beam combiners, and/or beam splitter/combiners may be various optical structures known in the art. In an example embodiment, the beam splitter, beam combiner, and/or beam splitter/combiner may be embodied as a direction coupler or photonic direction coupler. For example, the junction between two passive elements (e.g., two passive portions 110A, 110B, between a passive portion 110A, 110B and a passive waveguide 210, 410, 505, and/or between two passive waveguides 210, 410, 505) includes positioning the two passive elements close together. For example, the two passive elements may be positioned, at the junction between the two passive elements, such that the nominal claddings surrounding the passive waveguides of the passive elements are in physical contact with one another. In an example embodiment, the beam splitter, beam combiner, and/or beam splitter/combiner may be embodied as a multimode interference coupler. For example, the junction between two passive elements (e.g., two passive portions 110A, 110B, between a passive portion 110A, 110B and a passive waveguide 210, 410, 505, and/or between two passive waveguides 210, 410, 505) includes positioning the two passive elements close together such that the passive waveguides of the passive elements are in physical contact with one another for a given designed length.

Technical Advantages

Various embodiments provide integrated active/passive modulator units 100 and/or modulators (e.g., MZI modulators 200, cascaded MZI modulators 300, ring modulators 400, cascaded ring modulators 500, parallel ring modulators 600, and/or the like) comprising one or more units 100. The units 100 are configured to change the phase of input photon beam with relatively low loss. In various embodiments, the input photon beam has a power of approximately 100 mW or more. In various embodiments, the unit 100 and/or a modulator comprising one or more units is configured to receive an input beam and/or provide an output beam (and/or a combined output beam) for a broad range of wavelengths. For example, the input photon beam (and/or output beam and/or combined output beam) may be a visible or UV beam (e.g., in the wavelength range of approximately 350-1000 nm).

In various embodiments, a modulator comprising one or more units 100 provides an extinction ration between the high intensity/on state and the low intensity/off state of the combined output beam of at least approximately 40 dB. Moreover, a modulator comprising one or more units 100 may be configured to modulate a beam between a high intensity/on state and a low intensity/off state at a frequency of approximately 100 MHz or faster.

The ability of the unit 100 to handle high power UV beams is provided via the tapered geometry of the active portion 150 of the unit 100. For example, the tapered geometry of the active portion 150 may be designed to control the optical field and/or mode of the beam that is coupled into the active waveguide 156 and/or coupled back into the passive waveguide 116 from the active waveguide 156. Additionally, the loss of the unit 100 is reduced and the ability of the unit 100 to handle high power visible and UV beams is increased by reducing and/or minimizing the portion of the optical path through the unit 100 that is in the active waveguide 156.

Thus, various embodiments of the integrated passive/active unit and/or modulators comprising one or more units may be used to perform controlled beam delivery of quickly modulated, high power beams in a low loss manner and with a high level of beam placement accuracy. Additionally, modulators comprising one or more units require less space than free optic paths and free space AOMs.

Exemplary Controller

In various embodiments, a modulator (e.g., an MZI modulator 200, cascaded MZI modulator 300, ring modulator 400, cascaded ring modulator 500, parallel ring modulator 600, and/or the like) comprising one or more units 100 is incorporated into a quantum computer 910. In various embodiments, a quantum computer 910 further comprises a controller 30 configured to control various elements of the quantum computer 910. For example, the controller 30 may be configured to control the voltage sources and/or drivers configured to provide electrical signal(s) 4 to control the modulation of one or more beams via the modulator(s), a cryogenic system and/or vacuum system controlling the temperature and pressure within the cryogenic and/or vacuum chamber 40, manipulation sources 60, and/or other systems controlling the environmental conditions (e.g., temperature, humidity, pressure, and/or the like) within the cryogenic and/or vacuum chamber 40 and/or configured to manipulate and/or cause a controlled evolution of quantum states of one or more ions within the ion trap 50.

As shown in FIG. 15, in various embodiments, the controller 30 may comprise various controller elements including processing elements 1005, memory 1010, driver controller elements 1015, a communication interface 1020, analog-digital converter elements 1025, and/or the like. For example, the processing elements 1005 may comprise programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like. and/or controllers. The term circuitry may refer to an entirely hardware embodiment or a combination of hardware and computer program products. In an example embodiment, the processing element 1005 of the controller 30 comprises a clock and/or is in communication with a clock.

For example, the memory 1010 may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, DIMM SIMM VRAM, cache memory, register memory, and/or the like. In various embodiments, the memory 1010 may store qubit records corresponding the qubits of quantum computer (e.g., in a qubit record data store, qubit record database, qubit record table, and/or the like), a calibration table, an executable queue, computer program code (e.g., in a one or more computer languages, specialized controller language(s), and/or the like), and/or the like. In an example embodiment, execution of at least a portion of the computer program code stored in the memory 1010 (e.g., by a processing element 1005) causes the controller 30 to perform one or more steps, operations, processes, procedures and/or the like described herein for tracking the phase of an atomic object within an atomic system and causing the adjustment of the phase of one or more manipulation sources and/or signal(s) generated thereby.

In various embodiments, the driver controller elements 1015 may include one or more drivers and/or controller elements each configured to control one or more drivers. In various embodiments, the driver controller elements 1015 may comprise drivers and/or driver controllers. For example, the driver controllers may be configured to cause one or more corresponding drivers to be operated in accordance with executable instructions, commands, and/or the like scheduled and executed by the controller 30 (e.g., by the processing element 1005). In various embodiments, the driver controller elements 1015 may enable the controller 30 to operate a manipulation source 64, provide an electrical signal 4 to an active portion 150 of at least one unit 100, and/or the like. In various embodiments, the drivers may be laser drivers; vacuum component drivers; drivers for controlling the flow of current and/or voltage of an electrical signal 4 applied to an active portion 150 of a unit 100; cryogenic and/or vacuum system component drivers; and/or the like. In various embodiments, the controller 30 comprises means for communicating and/or receiving signals from one or more optical receiver components such as cameras, MEMs cameras, CCD cameras, photodiodes, photomultiplier tubes, and/or the like. For example, the controller 30 may comprise one or more analog-digital converter elements 1025 configured to receive signals from one or more optical receiver components, calibration sensors, and/or the like.

In various embodiments, the controller 30 may comprise a communication interface 1020 for interfacing and/or communicating with a computing entity 10. For example, the controller 30 may comprise a communication interface 1020 for receiving executable instructions, command sets, and/or the like from the computing entity 10 and providing output received from the quantum computer 910 (e.g., from an optical collection system) and/or the result of a processing the output to the computing entity 10. In various embodiments, the computing entity 10 and the controller 30 may communicate via a direct wired and/or wireless connection and/or one or more wired and/or wireless networks 20.

Exemplary Computing Entity

FIG. 16 provides an illustrative schematic representative of an example computing entity 10 that can be used in conjunction with embodiments of the present invention. In various embodiments, a computing entity 10 is configured to allow a user to provide input to the quantum computer 910 (e.g., via a user interface of the computing entity 10) and receive, display, analyze, and/or the like output from the quantum computer 910.

As shown in FIG. 16, a computing entity 10 can include an antenna 1112, a transmitter 1104 (e.g., radio), a receiver 1106 (e.g., radio), and a processing element 1108 that provides signals to and receives signals from the transmitter 1104 and receiver 1106, respectively. The signals provided to and received from the transmitter 1104 and the receiver 1106, respectively, may include signaling information/data in accordance with an air interface standard of applicable wireless systems to communicate with various entities, such as a controller 30, other computing entities 10, and/or the like. In this regard, the computing entity 10 may be capable of operating with one or more air interface standards, communication protocols, modulation types, and access types. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 10 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10 can also download changes, add-ons, and updates, for instance, to its firmware, software (e.g., including executable instructions, applications, program modules), and operating system.

The computing entity 10 may also comprise a user interface device comprising one or more user input/output interfaces (e.g., a display 1116 and/or speaker/speaker driver coupled to a processing element 1108 and a touch screen, keyboard, mouse, and/or microphone coupled to a processing element 1108). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for interaction therewith via one or more user input interfaces. The user input interface can comprise any of a number of devices allowing the computing entity 10 to receive data, such as a keypad 1118 (hard or soft), a touch display, voice/speech or motion interfaces, scanners, readers, or other input device. In embodiments including a keypad 1118, the keypad 1118 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 10 can collect information/data, user interaction/input, and/or the like.

The computing entity 10 can also include volatile storage or memory 1122 and/or non-volatile storage or memory 1124, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An integrated passive/active modulator unit comprising:
  a passive waveguide comprising an upstream portion, a downstream portion, and a central portion between the upstream portion and the downstream portion, the width of the passive waveguide substantially maintained at a particular width in the upstream portion, the central portion, and the downstream portion; and
  an active portion between the upstream passive portion and the downstream passive portion of the passive waveguide, the active portion comprising (a) an active waveguide and (b) electrical contacts in electrical communication with the active waveguide,
  wherein the active waveguide comprises at least one of (a) an upstream taper or (b) a downstream taper, the upstream taper configured to optically couple the active waveguide to the passive waveguide of the upstream portion, and the downstream taper configured to optically couple the active waveguide to the passive waveguide of the downstream portion.

2. The integrated passive/active modulator unit of claim 1, wherein at least one of the active waveguide or the passive waveguide is configured to transmit and/or modulate a photonic beam characterized by a wavelength in a range substantially of 350-1000 nm.

3. The integrated passive/active modulator unit of claim 1, wherein the active waveguide is made of a first material, the first material characterized by the refractive index of the first material changing in response to an electrical signal applied to the electrical contacts.

4. The integrated passive/active modulator unit of claim 3, wherein the first material comprises at least one of $LiNbO_3$, $ZrO_2$ doped $LiNbO_3$, $LiTaO_3$, MgO doped $LiTaO_3$, or $BaTiO_3$.

5. The integrated passive/active modulator unit of claim 1, wherein the passive waveguide is made of second material comprising at least one of $Al_2O_3$, $Si_3N_4$, $HfO_2$, AlN, or $Ta_2O_5$.

6. The integrated passive/active modulator unit of claim 1, wherein the upstream passive portion, the downstream passive portion, and the active portion further comprise a first cladding layer disposed between a substrate and the passive waveguide and a second cladding layer that, with the first cladding layer, encloses the passive waveguide.

7. The integrated passive/active modulator unit of claim 6, wherein the first and second cladding layers are oxide layers.

8. The integrated passive/active modulator unit of claim 1, wherein the upstream taper and/or downstream taper extends outward along a unit axis defined by a beam propagation direction through the integrated passive/active modulator unit; in the upstream taper, the active waveguide widens from a upstream taper end width at the upstream end of the active waveguide to a primary active waveguide width at a central region of the active waveguide; and in the downstream taper, the active waveguide narrows from the primary active waveguide width at the central region of the active waveguide to a downstream taper end width.

9. An integrated passive/active modulator comprising:
at least one passive/active modulator unit, comprising:
an upstream passive portion comprising a portion of a passive waveguide;
a downstream passive portion comprising a continuation of the passive waveguide; and
an active portion between the upstream passive portion and the downstream passive portion, the active portion comprising (a) an active waveguide, (b) electrical contacts in electrical communication with the active waveguide, and (c) a central portion of the passive waveguide,
wherein the active waveguide comprises at least one of (a) an upstream taper or (b) a downstream taper, the upstream taper configured to optically couple the active waveguide to the portion of the passive waveguide of the upstream portion, and the downstream taper configured to optically couple the active waveguide to the continuation of the passive waveguide of the downstream portion; and
at least one additional passive waveguide coupled to the upstream passive portion and the downstream passive portion via one or more beam splitters and/or beam combiners, wherein a beam combiner of the one or more beam splitters and/or beam combiners is configured to couple a first beam output by the downstream portion with a second beam to cause interference of the first beam and the second beam.

10. The integrated passive/active modulator of claim 9, wherein the at least one passive/active modulator unit comprises a pair of passive active/modulator units coupled to one another in parallel such that the first beam is output by a first passive/active modulator unit of the pair of passive/active modulator units and the second beam is output by a second passive/active modulator unit of the pair of passive/active modulator units.

11. The integrated passive/active modulator of claim 9, wherein the at least one passive/active modulator unit comprises two or more pairs of passive active/modulator units, each pair of passive/active modulator units coupled in parallel, and a first pair of passive/active modulator units serially coupled to a second pair of passive/active modulator units.

12. The integrated passive/active modulator of claim 9, wherein the at least one unit is formed into a ring such that both the upstream passive portion and the downstream passive portion are coupled to a same additional passive waveguide, the second beam propagating through the passive waveguide.

13. The integrated passive/active modulator of claim 9, wherein the at least one additional passive waveguide comprises a through passive waveguide and a ring passive waveguide, the ring passive waveguide is configured to couple light into and out of the through passive waveguide, and the at least one unit is formed into a ring such that both the upstream passive portion and the downstream passive portion are coupled to the ring passive waveguide.

14. The integrated passive/active modulator of claim 9, wherein the at least one integrated passive/active modulator unit comprises at least two integrated passive/active modulator units each formed into a ring such that both the upstream portion and the downstream portion of a first unit of the at least two integrated passive/active modulator units are coupled to a same additional passive waveguide and both the upstream portion and the downstream portion of a second unit of the at least two integrated passive/active modulator units are coupled to the same additional passive waveguide, and the first unit and the second unit are serially coupled to the same additional passive waveguide.

15. The integrated passive/active modulator of claim 9, wherein the integrated passive/active modulator is configured to provide a combined output beam that can be modulated between a high intensity/on state and a low intensity/off state with a frequency substantially equal to or greater than 100 MHz.

16. The integrated passive/active modulator of claim 9, wherein the integrated passive/active modulator is configured to provide a combined output beam that has an extinction ratio between a high intensity/on state and a low intensity/off state substantially equal to or greater than 40 dB.

17. An integrated passive/active modulator comprising:
at least one pair of passive/active modulator units, each passive/active modulator unit of the at least one pair of passive/active modulator units comprising:
an upstream passive portion comprising a passive waveguide;
a downstream passive portion comprising a continuation of the passive waveguide; and
an active portion between the upstream passive portion and the downstream passive portion, the active portion comprising an active waveguide and electrical contacts in electrical communication with the active waveguide, wherein the active waveguide comprises at least one of (a) an upstream taper or (b) a downstream taper, the upstream taper configured to optically couple the active waveguide to the passive waveguide of the upstream portion, and the downstream taper configured to optically couple the active waveguide to the continuation of the passive waveguide of the downstream portion at least one additional passive waveguide coupled to the upstream passive portion and the downstream passive portion via one or more beam splitters and/or beam combiners, wherein the at least one pair of passive/active modulator units are coupled to one another in parallel.

18. The integrated passive/active modulator of claim 17, wherein the at least one pair of passive/active modulator units comprises a first pair of passive/active modulator units and a second pair of passive/active modulator units, and the first pair of passive/active modulator units is serially coupled to the second pair of passive/active modulator units.

* * * * *